(12) United States Patent
Yajima et al.

(10) Patent No.: US 10,102,676 B2
(45) Date of Patent: Oct. 16, 2018

(54) INFORMATION PROCESSING APPARATUS, DISPLAY APPARATUS, INFORMATION PROCESSING METHOD, AND PROGRAM

(71) Applicant: SEIKO EPSON CORPORATION, Tokyo (JP)

(72) Inventors: Kenro Yajima, Matsumoto (JP); Yuichi Mori, Minowa-machi (JP)

(73) Assignee: SEIKO EPSON CORPORATION, Tokyo (JP)

(*) Notice: Subject to any disclaimer, the term of this patent is extended or adjusted under 35 U.S.C. 154(b) by 25 days.

(21) Appl. No.: 15/352,003

(22) Filed: Nov. 15, 2016

(65) Prior Publication Data

US 2017/0161957 A1 Jun. 8, 2017

(30) Foreign Application Priority Data

Dec. 3, 2015 (JP) ................. 2015-236321

(51) Int. Cl.
*G02B 27/01* (2006.01)
*G06F 3/01* (2006.01)
*G06K 9/00* (2006.01)
*G06K 9/46* (2006.01)
*G06T 19/00* (2011.01)
*G06T 7/00* (2017.01)
*G06F 3/0481* (2013.01)
*G06F 3/0484* (2013.01)

(52) U.S. Cl.
CPC ........ *G06T 19/006* (2013.01); *G02B 27/0172* (2013.01); *G02B 27/0179* (2013.01); *G06F 3/011* (2013.01); *G06F 3/017* (2013.01); *G06F 3/04815* (2013.01); *G06F 3/04842* (2013.01); *G06K 9/00355* (2013.01); *G06K 9/00362* (2013.01); *G06K 9/00671* (2013.01); *G06K 9/4604* (2013.01); *G06K 9/4661* (2013.01); *G06T 7/004* (2013.01); *G06T 7/0051* (2013.01); *G06T 7/0081* (2013.01); *G02B 2027/0138* (2013.01); *G02B 2027/0178* (2013.01); *G02B 2027/0187* (2013.01); *G06T 2200/24* (2013.01); *G06T 2215/16* (2013.01)

(58) Field of Classification Search
None
See application file for complete search history.

(56) References Cited

U.S. PATENT DOCUMENTS 9,383,895 B1* 7/2016 Vinayak ............... G06F 3/017
2007/0262965 A1* 11/2007 Hirai .................. B60R 11/0235
345/173
2011/0140994 A1* 6/2011 Noma .................. G02B 27/017
345/8

(Continued)

FOREIGN PATENT DOCUMENTS

JP 2011-253324 A 12/2011
JP 2015-045805 A 3/2015
JP 2015-046092 A 3/2015

*Primary Examiner* — Yingchun He
(74) *Attorney, Agent, or Firm* — Oliff PLC

(57) ABSTRACT

An information processing apparatus including an imaging section that performs imaging over a range including at least part of a user's field of view and a control section that detects the user's operation based on an image captured by the imaging section and estimates a target object from objects contained in the captured image in accordance with the detected operation.

17 Claims, 14 Drawing Sheets

(56) References Cited

U.S. PATENT DOCUMENTS

2015/0062000 A1     3/2015  Saito
2015/0062165 A1     3/2015  Saito
2015/0227222 A1*    8/2015  Sako ...................... G06F 3/011
                                                           345/173

* cited by examiner

INFORMATION PROCESSING APPARATUS, DISPLAY APPARATUS, INFORMATION PROCESSING METHOD, AND PROGRAM

BACKGROUND

1. Technical Field

The present invention relates to an information processing apparatus, a display apparatus, an information processing method, and a program.

2. Related Art

There is a known apparatus of related art that captures an image of a commercial product, identifies the commercial product on the basis of the captured image, and displays information on the commercial product (see JP-A-2011-253324, for example). The apparatus described in JP-A-2011-253324 is an HMD (head mounted display) mounted on a user's head for use and includes a camera that performs imaging in the direction of the wearer's line of sight. The HMD transmits an image captured with the camera to a server, acquires information on the commercial product from the server, and displays an image associated with the commercial product in the form of an augmented reality (AR) image on the basis of the acquired commercial product information.

To recognize or identify an object, such as a commercial product, in a captured image, as the apparatus described in JP-A-2011-253324 does, recognition of all objects displayed in the captured image is rather inconvenient. It is therefore necessary to carry out the process of selecting an object to be processed from the objects displayed in the captured image. For example, the apparatus described in JP-A-2011-253324 evaluates whether or not the captured image contains a person's fingers and evaluate the wearer movement state and motion of the wearer's head on the basis of a change in acceleration detected with an acceleration sensor to recognize a commercial product having commercial product information to be displayed. In the method, in which a complicated process including a process associated with a captured image and a process associated with acceleration detected with the acceleration sensor is carried out, the processing burden is large and there is a concern about delay.

SUMMARY

An advantage of some aspects of the invention is to provide an information processing apparatus, a display apparatus, an information processing method, and a program capable of carrying out the process of selecting an imaged object on the basis of a captured image in the form of a light-burden process.

An information processing apparatus according to an aspect of the invention includes an imaging section that performs imaging over a range including at least part of a user's field of view and a control section that detects the user's operation based on an image captured by the imaging section and estimates a target object from objects contained in the captured image in accordance with the detected operation.

According to the aspect of the invention, the user's operation is detected on the basis of an image captured over the range including the user's field of view, and a target object is estimated in accordance with the detected operation. The target object can therefore be selected by processing the captured image, whereby light-burden processing is achieved.

The user's operation used herein includes operation that the user performs by using the user's own body, may further include operation that the user performs by using an operation body that is an object the user holds with a hand, and may still further include operation using an operation body mounted on the user's body, clothing, or any other site.

In the information processing apparatus described above, the control section may detect an image of the user's body contained in the captured image to detect the user's operation.

According to the aspect of the invention with this configuration, the user's operation can be detected on the basis of the captured image.

In the information processing apparatus described above, a region containing part of the captured image and a condition under which an image of the user's body is detected in the region may be set, and the control section may evaluate whether or not an object contained in the captured image is an image of the user's body in accordance with the condition set in the region containing the object to detect the user's body.

According to the aspect of the invention with this configuration, in the process of detecting the user's operation on the basis of the captured image, occurrence of wrong detection can be reduced.

In the information processing apparatus described above, priority may be set in the region in accordance with a position of the region in the captured image, and whether the object contained in the region is an image of the user's body may be evaluated in accordance with the priority, and the control section may evaluate whether or not the object is an image of the user's body in accordance with the priority set in the region containing the object.

According to the aspect of the invention with this configuration, occurrence of wrong detection in a case where the user's operation is detected on the basis of the captured image can be reduced, whereby detection accuracy can be increased. For example, in a case where the captured image contains images of the user's body in a plurality of positions, an image that should be detected as the user's operation can be distinguished on the basis of the priority. The possibility of detection of the user's intended operation can therefore be increased, whereby improvement in detection accuracy can be expected.

In the information processing apparatus described above, the region may be formed of a plurality of regions, and in each of the regions may be set priority according to the position of the region in the captured image.

According to the aspect of the invention with this configuration, occurrence of wrong detection in a case where the user's operation is detected on the basis of the captured image can be reduced, whereby detection accuracy can be increased. Further, the priority that affects the process of detecting the operation is advantageously readily set and managed.

In the information processing apparatus described above, in the region located on a side facing a bottom side of the captured image may be set higher priority than in the region shifted from the bottom-side region to a top side of the captured image.

According to the aspect of the invention with this configuration, higher priority is set in a region located on the side facing the bottom side, where an image of the user's body is likely to be captured when the user performs operation, than in a region located on the side facing the top side, whereby the accuracy of detection of the user's operation can be increased.

The side facing the bottom side of a captured image refers to the side facing a side that forms the bottom on the basis of the upward/downward direction at the time of imaging. Instead, the bottom side may be defined in a captured image in advance.

In the information processing apparatus described above, the control section may detect the object that overlaps with an edge of the captured image as an image of the user's body.

According to the aspect of the invention with this configuration, an image of the user's body captured when the user performs operation can be detected with high accuracy.

In the information processing apparatus described above, the control section may detect an image of a person's hand contained in the captured image and evaluate whether the detected hand image is an image of the user's body based on whether the hand image is a right hand image or a left hand image and a position of the hand image in the captured image.

According to the aspect of the invention with this configuration, occurrence of wrong detection in a case where the user's operation is detected on the basis of the captured image can be reduced, whereby detection accuracy can be increased.

In the information processing apparatus described above, in a case where the image of a person's hand detected in the captured image contains an edge of the captured image, the control section may determine the hand image as an image of the user's body.

According to the aspect of the invention with this configuration, an image of the user's body captured when the user performs operation can be detected with high accuracy.

The information processing apparatus described above may further include a distance detection section that detects a distance to a measurement target object, and the control section may detect, among the objects contained in the captured image, the object located in a position separate by a distance that is detected by the distance detection section and is smaller than or equal to a predetermined value as an image of the user's body.

According to the aspect of the invention with this configuration, the detection accuracy in the case where an image of the user's body is detected on the basis of the captured image can be further increased.

In the information processing apparatus described above, the control section may detect an image of a person's hand contained in the captured image, and in a case where the distance detected by the distance detection section to the measurement target object corresponding to the hand image contains a plurality of distances set in advance, the control section may determine the hand image as an image of the user's body.

According to the aspect of the invention with this configuration, the detection accuracy in the case where an image of the user's body is detected on the basis of the captured image can be further increased.

In the information processing apparatus described above, the control section may estimate, among the objects contained in the captured image, the object separate from the user's body by a predetermined distance or smaller as the target object.

According to the aspect of the invention with this configuration, an object that is a target of the user's operation can be estimated with high accuracy.

In the information processing apparatus described above, the control section detects an image of a shadow of the user's body in the captured image, and the control section estimates, among the objects contained in the captured image, the object located in a position separate from the image of the shadow of the body by a predetermined distance or smaller as the target object.

According to the aspect of the invention with this configuration, since an object that is a target of the user's operation is estimated in consideration of the positional relationship between the user's body and the object, the accuracy of the estimation can be improved.

The information processing apparatus described above may further include an acquisition section that acquires a state or a result of detection performed by a body mounted detection apparatus mounted on the user's body, and the control section may estimate the target object based on the detection result acquired by the acquisition section.

According to the aspect of the invention with this configuration, the state or result of the detection performed by the body mounted detection apparatus mounted on the user's body can be used to estimate an object that is a target of the user's operation with high accuracy.

A display apparatus according to another aspect of the invention includes a display section mounted on a user's head, an imaging section that performs imaging over a range including at least part of the user's field of view, and a control section that detects the user's operation based on an image captured by the imaging section and estimates a target object from objects contained in the captured image in accordance with the detected operation.

According to the aspect of the invention, the user's operation is detected on the basis of an image captured over the range including the user's field of view, and a target object is estimated in accordance with the detected operation. The target object can therefore be selected by processing the captured image, whereby light-burden processing is achieved.

In the display apparatus described above, the control section may detect objects contained in the captured image and an image of the user's body contained in the captured image and cause the display section to display a GUI image in accordance with a position and a shape of the object other than the user's body.

According to the aspect of the invention with this configuration, a GUI (graphical user interface) image is displayed in correspondence with the user's operation, whereby a user interface that provides excellent operability can be provided.

The display apparatus described above may further include a distance detection section that detects a distance to a measurement target object, and the control section may cause the display section to display the GUI image based on a distance to the measurement target object corresponding to the object other than the user's body.

According to the aspect of the invention with this configuration, the process of displaying the GUI image can be optimized, whereby the operability of the user interface can be increased.

An information processing method according to still another aspect of the invention includes performing imaging over a range including at least part of a user's field of view, detecting the user's operation based on a captured image, and estimating any of a plurality of objects contained in the captured image as a target object in accordance with the detected operation.

According to the aspect of the invention, the user's operation is detected on the basis of an image captured over the range including the user's field of view, and a target object is estimated in accordance with the detected operation. The target object can therefore be selected by processing the captured image, whereby light-burden processing is achieved.

Yet another aspect of the invention relates to a program executable by a computer that controls an information processing apparatus, the computer carrying out the process of detecting the user's operation based on an image captured over a range including at least part of a user's field of view and estimating any of a plurality of objects contained in the captured image as a target object in accordance with the detected operation.

According to the aspect of the invention, the user's operation is detected on the basis of an image captured over the range including the user's field of view, and a target object is estimated in accordance with the detected operation. The target object can therefore be selected by processing the captured image, whereby light-burden processing is achieved.

The invention can also be implemented in a variety of forms other than the information processing apparatus, the display apparatus, the information processing method, and the program described above. For example, the invention can be embodied in the form of a recording medium on which the program described above is recorded, a server device that distributes the program, a transport medium that transports the program described above, or a data signal carrying the program described above embodied in a carrier wave. Instead, a server device or any other device that can communicate with the information processing apparatus or the display apparatus described above may execute the program to function as the control section or the computer that controls the information processing apparatus or the display apparatus described above. The server device or any other device in this case can form what is called cloud computing that provides a processing function over a communication network.

BRIEF DESCRIPTION OF THE DRAWINGS

The invention will be described with reference to the accompanying drawings, wherein like numbers reference like elements.

DESCRIPTION OF EXEMPLARY EMBODIMENTS

Figure 1:
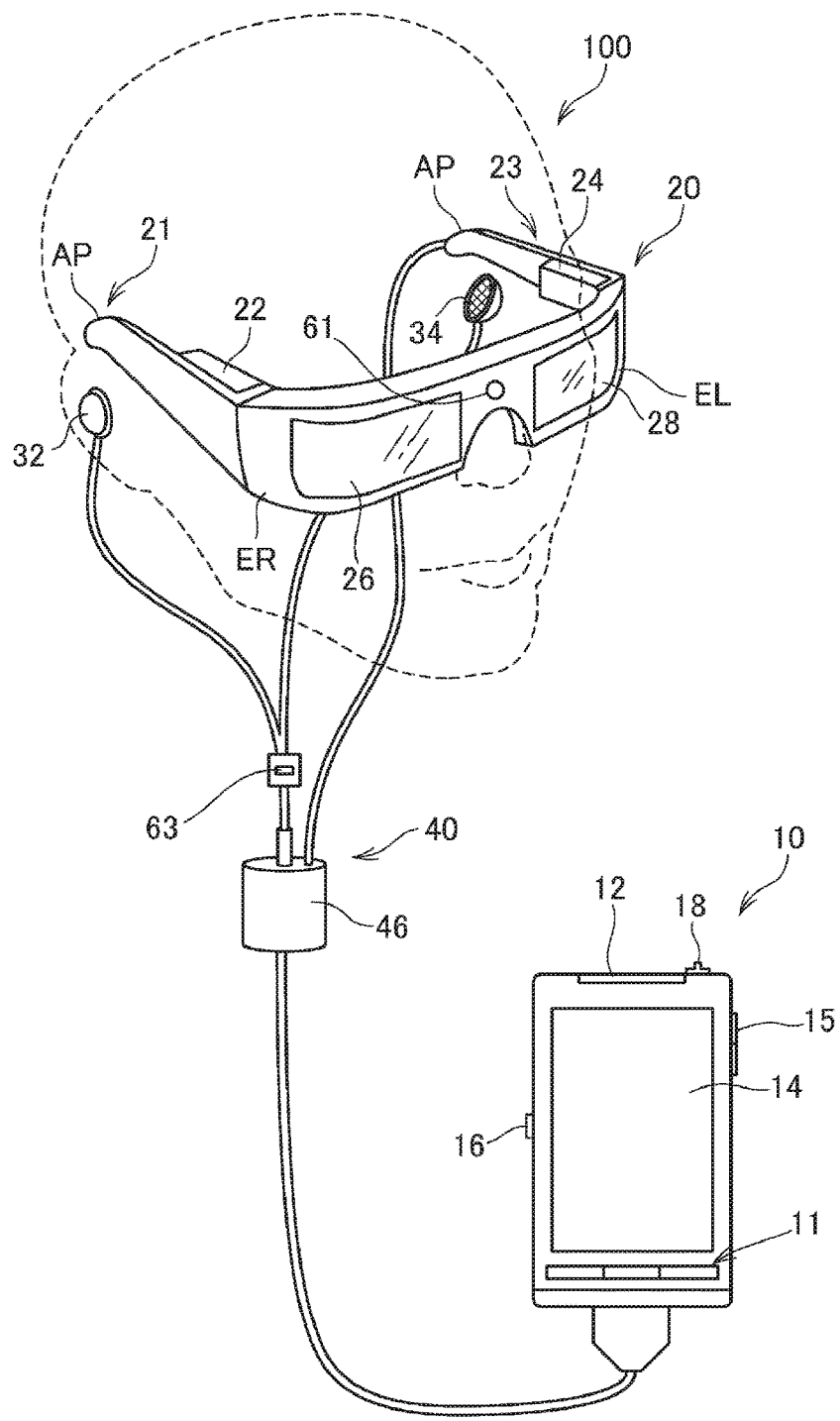
FIG. 1 is a descriptive diagram showing an exterior configuration of an HMD.

FIG. 1 is a descriptive diagram showing an exterior configuration of an HMD (head mounted display) 100 according to an embodiment to which the invention is applied.

The HMD 100 (information processing apparatus) is a display apparatus including an image display section 20, which is mounted on a user's head and allows the user to visually recognize a virtual image, a control device 10, which controls the image display section 20. The control device 10 also functions as a controller that allows the user to operate the HMD 100.

The image display section 20 is a mountable member mounted on the user's head and has a spectacle-like shape in the present embodiment. The image display section 20 includes a right holder 21, a right display driver 22, a left holder 23, a left display driver 24, a right optical image display section 26, a left optical image display section 28, a camera 61 (imaging section), and a microphone 63. The right optical image display section 26 and the left optical image display section 28 are so disposed as to be located in front of the right and left eyes of the user on whom the image display section 20 is mounted. One end of the right optical image display section 26 and one end of the left optical image display section 28 are connected to each other in a position corresponding to the portion between the eyes of the user on whom the image display section 20 is mounted.

The right holder 21 is a member extending from an end ER, which is the other end of the right optical image display section 26, to a position corresponding to a temporal region of the user on whom the image display section 20 is mounted. Similarly, the left holder 23 is a member extending from an end EL, which is the other end of the left optical image display section 28, to a position corresponding to another temporal region of the user on whom the image display section 20 is mounted. The right holder 21 and the left holder 23, which serve in the same manner as temples (bows) of spectacles do, hold the image display section 20 on the user's head.

The right display driver 22 and the left display driver 24 are disposed on opposite sides of the head of the user on whom the image display section 20 is mounted. The right display driver 22 and the left display driver 24 are also simply called "display drivers" in a collective manner, and the right optical image display section 26 and the left optical image display section 28 are also simply called "optical image display sections" in a collective manner.

The display drivers 22 and 24 include liquid crystal displays 241 and 242 (hereinafter referred to as "LCDs 241 and 242"), projection systems 251 and 252, and other components. The projection systems 251 and 252 will be described later with reference to FIGS. 2 to 4.

The right optical image display section 26 and the left optical image display section 28 include light guide plates 261 and 262 (FIG. 2) and light control plates 20A. The light guide plates 261 and 262 are made, for example, of a light transmissive resin and guide image light outputted by the display drivers 22 and 24 to the user's eyes. The light control plates 20A are each a thin-plate-shaped optical element and so disposed as to cover the front side of the image display section 20, which is the side opposite the side where the user's eyes are present. Each of the light control plates 20A can be a plate having light transmittance of substantially zero, a nearly transparent plate, a plate that transmits but attenuates light, a plate that attenuates or reflects light of a specific wavelength, or any of a variety of other optical components. Appropriate selection of optical characteristics (such as light transmittance) of the light control plates 20A allows adjustment of the amount of outside light externally incident on the right optical image display section 26 and the left optical image display section 28 and therefore allows adjustment of visibility of a virtual image. The present embodiment will be described with reference to a case where the light control plates 20A are optically transmissive enough to allow the user on whom the HMD 100 is mounted to visually recognize at least an outside scene. The light control plates 20A also protect the right light guide plate 261 and the left light guide plate 262 and prevent the right light guide plate 261 and the left light guide plate 262 from being damaged, dirt from adhering thereto, and other defects from occurring.

The light control plates 20A may be configured to be attachable to and detachable from the right optical image display section 26 and the left optical image display section 28, or a plurality of types of light control plates 20A may be exchangeably attachable. The light control plates 20A may even be omitted.

The camera 61 is disposed in the central position of the front surface of the image display section 20. The camera 61 is a digital camera including an imaging device, such as a CCD or a CMOS device, an imaging lens, and other components. The camera 61 may be formed of a stereoscopic camera. The camera 61 captures an image of at least part of an outside scene (real space) in the direction extending from the front side of the HMD 100, in other words, in the direction toward the visual field of the user on whom the HMD 100 is mounted. In another expression, it can be said that the camera 61 performs imaging over the range or in the direction that overlaps with the user's visual field and perform imaging in the direction in which the user gazes. The range of the angle of view of the camera 61 can be set as appropriate. In the present embodiment, the range of the camera 61 covers the outside visually recognized by the user through the right optical image display section 26 and the left optical image display section 28, as will be described later. Further, it is more preferable that the image capturing range of the camera 61 is so set that the camera 61 can capture an image of the user's entire visual field through the light control plates 20A.

The camera 61 performs imaging under the control of an imaging control section 161 (FIG. 4) provided in a control section 140 and outputs captured image data to the imaging control section 161.

The HMD 100 may further include a distance sensor (not shown) that detects the distance to a measurement target object positioned in a measurement direction set in advance. The distance sensor is disposed, for example, at the boundary between the right optical image display section 26 and the left optical image display section 28. In this case, in a state in which the image display section 20 is mounted on the user, the position of the distance sensor 64 is roughly at the middle of the user's both eyes in the horizontal direction but above the user's both eyes in the vertical direction. The measurement direction of the distance sensor 64 can, for example, be a direction that extends from the front side of the HMD 100 and overlaps with the imaging direction of the camera 61.

The distance sensor can be formed, for example, of a light source, such as an LED and a laser diode, and a light receiver that receives reflected light formed of light emitted from the light source and reflected off the measurement target object. The distance sensor may perform distance measurement based on triangulation or time difference under the control of the control section 140. The distance sensor may instead be formed of a sound source that emits an ultrasonic wave and a detector that receives the ultrasonic wave reflected off the measurement target object. In this case, the distance sensor may perform distance measurement based on the difference in time spent until the ultrasonic wave is reflected under the control of the control section 140.

Figure 2:
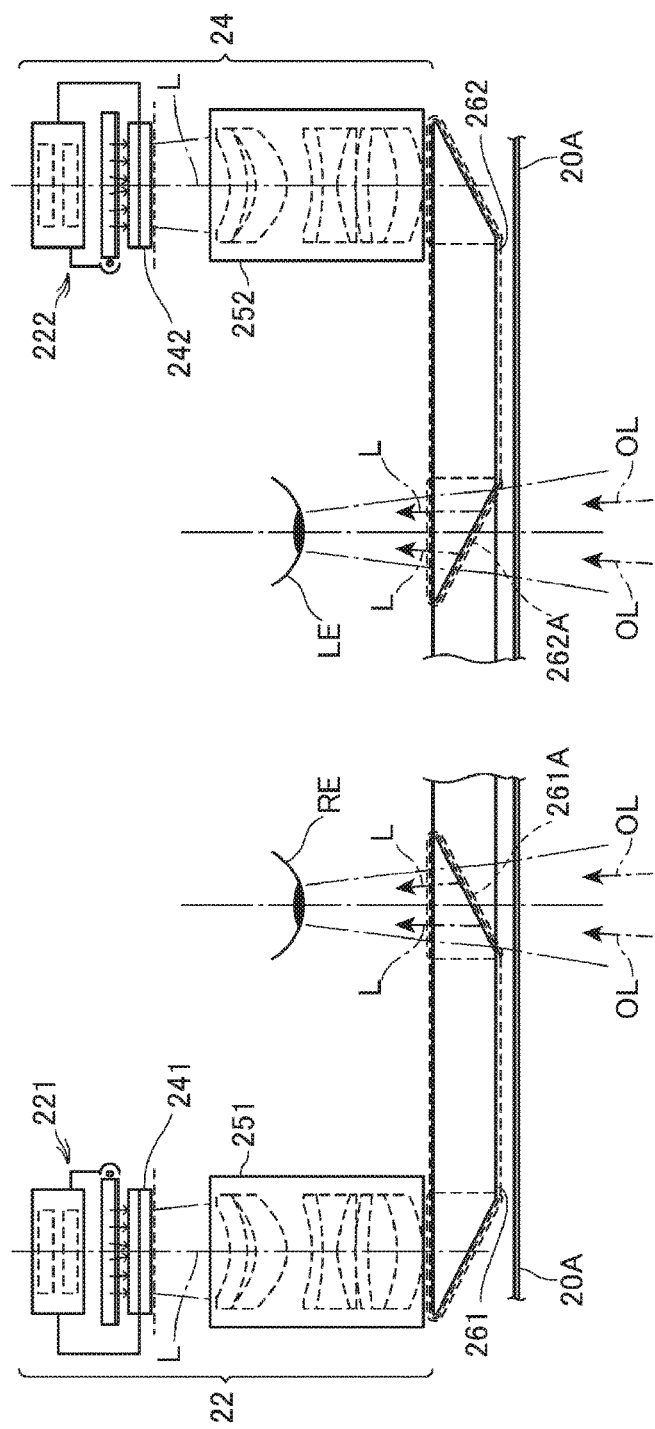
FIG. 2 shows the configuration of an optical system of an image display section.

FIG. 2 is a key part plan view showing the configuration of an optical system provided in the image display section 20. FIG. 2 shows the user's left eye LE and right eye RE for ease of description.

The left display driver 24 includes a left backlight 222, which has a light source, such as an LED, and a diffuser, the left LCD 242, which is a transmissive LCD disposed on the optical path of light emitted from the diffuser in the left backlight 222, and the left projection system 252, which includes a group of lenses that guide image light L having passed through the left LCD 242 and other components. The left LCD 242 is a transmissive liquid crystal panel having a plurality of pixels arranged in a matrix.

The left projection system 252 includes a collimator lens that converts the image light L outputted from the left LCD 242 into a parallelized light flux. The image light L having been converted into a parallelized light flux by the collimator lens is incident on the left light guide plate 262. The left light guide plate 262 is a prism having a plurality of reflection surfaces that reflect the image light L, and the image light L undergoes reflection multiple times in the left light guide plate 262 and is guided toward the left eye LE. A half-silvered mirror 262A (reflection surface) is formed in the left light guide plate 262 and located in front of the left eye LE.

The image light L reflected off the half-silvered mirror 262A exits out of the left optical image display section 28 toward the left eye LE and forms an image on the retina of the left eye LE, and the image is visually recognized by the user.

The right display driver 22 is so configured that the right display driver 22 and the left display driver 24 are in bilateral symmetry. The right display driver 22 includes a right backlight 221, which has a light source, such as an LED, and a diffuser, the right LCD 241, which is a transmissive LCD disposed on the optical path of light emitted from the diffuser in the right backlight 221, and the right projection system 251, which includes a group of lenses that guide image light L having passed through the right LCD 241 and other components. The right LCD 241 is a transmissive liquid crystal panel having a plurality of pixels arranged in a matrix.

The right projection system 251 includes a collimator lens that converts the image light L outputted from the right LCD 241 into a parallelized light flux. The image light L having been converted into a parallelized light flux by the collimator lens is incident on the right light guide plate 261. The right light guide plate 261 is a prism having a plurality of reflection surfaces that reflect the image light L, and the image light L undergoes reflection multiple times in the right light guide plate 261 and is guided toward the right eye RE. A half-silvered mirror 261A (reflection surface) is formed in the right light guide plate 261 and located in front of the right eye RE.

The image light L reflected off the half-silvered mirror 261A exits out of the right optical image display section 26 toward the right eye RE and forms an image on the retina of the right eye RE, and the image is visually recognized by the user.

On the user's right eye RE is incident the image light L reflected off the half-silvered mirror 261A and outside light OL having passed through the corresponding light control plate 20A. On the left eye LE is incident the image light L reflected off the half-silvered mirror 262A and the outside light OL having passed through the corresponding light control plate 20A. The HMD 100 thus causes the image light L carrying an image processed in the HMD 100 and the outside light OL superimposed on each other to be incident on the user's eyes, whereby the user views an outside scene through the light control plates 20A and visually recognizes the image carried by the image light L and superimposed on the outside scene. The HMD 100 thus functions as a see-through-type display apparatus.

The left projection system 252 and the left light guide plate 262 are also collectively referred to as a "left light guide unit," and the right projection system. 251 and the right light guide plate 261 are also collectively referred to as a "right light guide unit." The configuration of the right and left light guide units is not limited to the example described above and can be arbitrarily configured as long as the image light is used to form a virtual image in a position in front of the user's eyes. For example, a diffraction grating may be used, or a half-transmissive/reflective film may be used.

The image display section 20 is connected to the control device 10 via a connection cable 40. The connection cable 40 includes a connector 46, to which a right earphone 32, a left earphone 34, and an earphone microphone having the microphone 63 can be connected.

Figure 4:
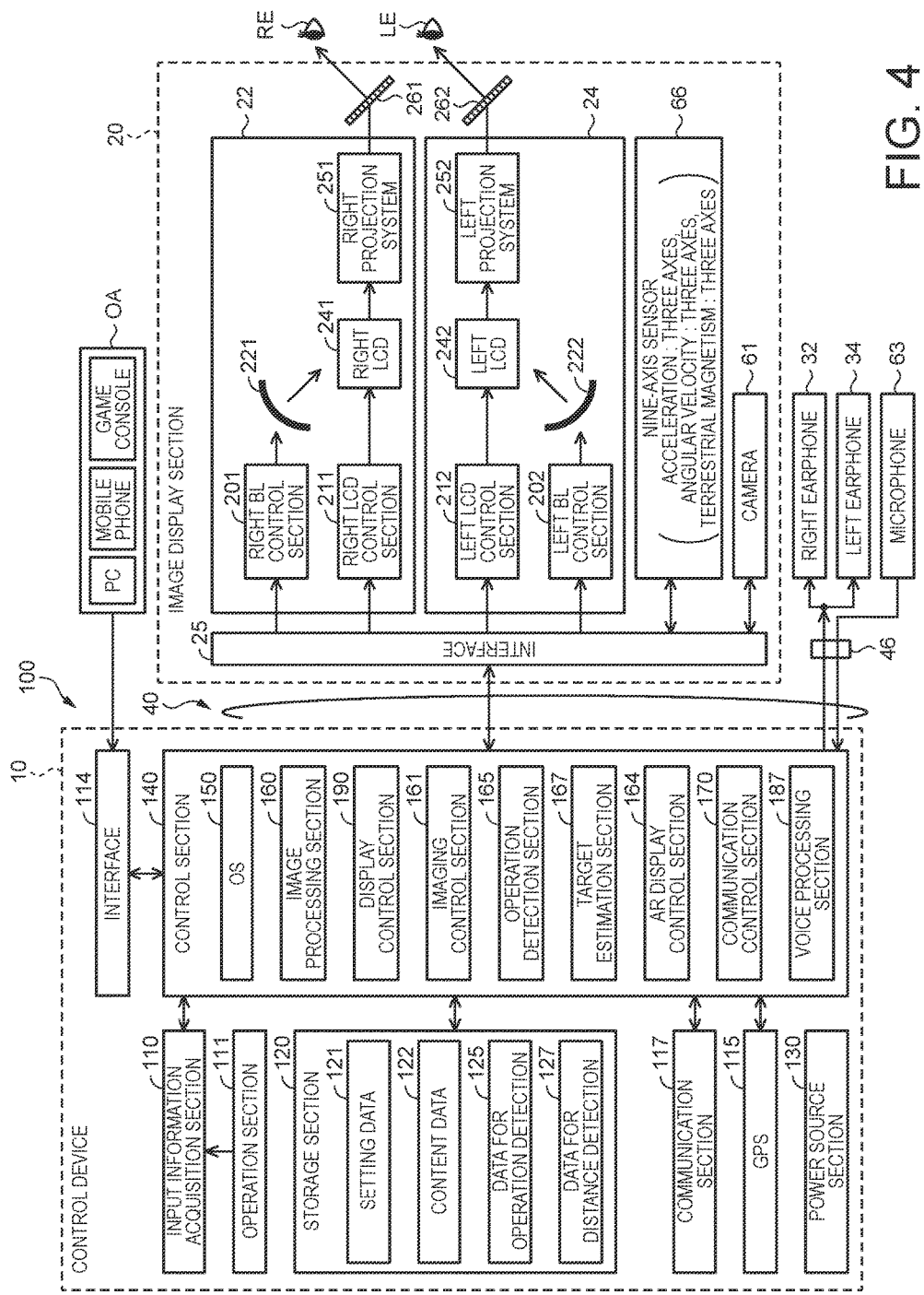
FIG. 4 is a functional block diagram of portions that form the HMD.

The microphone 63 is so disposed that a sound collector of the microphone 63 faces the direction of the user's line of sight as shown, for example, in FIG. 1, collects voice, and outputs a voice signal to a voice processing section 187 (FIG. 4). The microphone 63 may, for example, be a monaural microphone, a stereo microphone, a directional microphone, or an omni-directional microphone.

The connection cable 40 is permanently connected to the image display section 20 and connected to the control device 10 via a connector (not shown) in a disconnectable manner. Each of the control device 10 and the image display section 20 transmits and receives a variety of signals and/or a variety of data to and from the other via the connection cable 40.

The control device 10 controls the HMD 100. The control device 10 includes a key operation section 11, an LED indicator 12, a trackpad 14, upward/downward-direction keys 15, a changeover switch 16, and a power switch 18, which form an operation section 111 (FIG. 4).

The key operation section 11 has a menu key, a home key, a return key, and other keys for operating an operation system 150 (FIG. 4) executed by the control device 10.

The LED indicator 12 goes on or blinks in correspondence with the action state of the HMD 100. The upward/downward-direction keys 15 are used to input an instruction to increase and decrease the magnitude of the sound outputted from the right earphone 32 and the left earphone 34 and input an instruction to increase and decrease the brightness of an image displayed in the image display section 20. The changeover switch 16 is a switch that changes an input corresponding to operation of the upward/downward-direction keys 15. The power switch 18 is a switch that powers on or off the HMD 100 and is formed, for example, of a slide switch.

The trackpad 14 has an operation surface that detects contact operation and outputs an operation signal in accordance with operation performed on the operation surface. A method for detecting operation performed on the operation surface is not limited to a specific method and can, for example, be an electrostatic method, a pressure detection method, and an optical method.

Figure 3A:
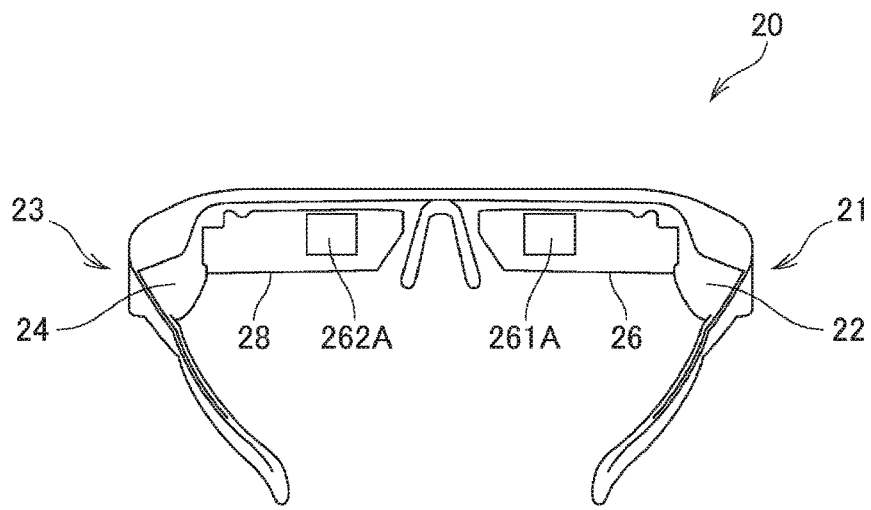
FIGS. 3A and 3B are descriptive diagram showing correspondence between an image display section and an imaging range.
Figure 3B:
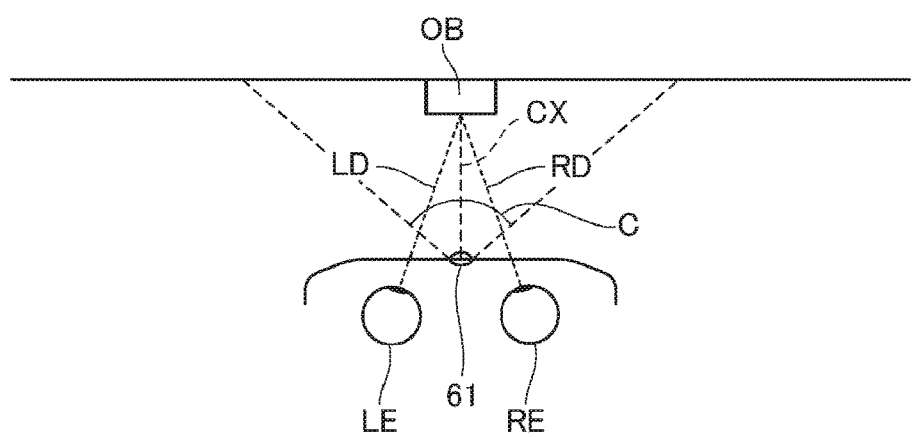

FIGS. 3A and 3B show the configuration of key parts of the image display section 20. FIG. 3A is a key part perspective view of the image display section 20 viewed from the side facing the user's head, and FIG. 3B describes the angle of view of the camera 61. It is noted that the connection cable 40 is not shown in FIG. 3A.

FIG. 3A shows one side of the image display section 20, that is, the side thereof facing the user's head, in other words, the side visible to the user's right eye RE and left eye LE. In another expression, FIG. 3A shows the rear side of the right optical image display section 26 and the left optical image display section 28.

In FIG. 3A, the half-silvered mirror 261A, which directs the image light to the user's right eye RE, and the half-silvered mirror 262A, which directs the image light to the user's left eye LE, are each viewed as a roughly rectangular region. Further, the entire right optical image display section 26 and left optical image display section 28 including the half-silvered mirrors 261A and 262A transmits outside light, as described above. The user therefore visually recognizes an outside scene through the entire right optical image display section 26 and left optical image display section 28 and further visually recognizes rectangular displayed images in the positions of the half-silvered mirrors 261A and 262A.

The camera 61 is disposed in the central position of the front surface of the image display section 20, as described above, and performs imaging in the direction in which the user's two eyes look at, that is, in the direction extending forward from the user. FIG. 3B is a plan view diagrammatically showing the position of the camera 61 along with the user's right eye RE and left eye LE. Reference character C denotes the angle of view (imaging range) of the camera 61. FIG. 3B shows the angle of view C in the horizontal direction, and it is noted that the actual angle of view of the camera 61 extends also in the upward/downward direction, as in a typical digital camera.

In the present embodiment, the optical axis CX of the camera 61 extends in the direction toward a point exactly in front of the image display section 20. In the example of the configuration, the camera 61 performs imaging in the direction toward a point in front of the user on whom the HMD 100 is mounted.

The angle of view C of the camera 61 includes the direction toward a point exactly in front of the central position of the image display section 20 and contains a range extending by a predetermined angle on the upper, lower, right, and left sides of the optical axis CX. For example, in a case where a target object OB is present in the direction toward a point in front of the image display section 20, the target object OB falls within the angle of view C, as shown in FIG. 3B, and the target object OB is displayed in an image captured with the camera 61. In this state, when the user gazes at the target object OB, the user's lines of sight are directed toward the target object OB, as indicated by reference characters RD and LD in FIG. 3B. In general, it is believed that a person's angular field of view is about 200 degrees in the horizontal direction and about 125 degrees in the vertical direction. Within these ranges, an effective field of view where a person has excellent information reception capability extends over a horizontal range of about 30 degrees and a vertical range of about 20 degrees. Further, it is believed that a stable field of fixation, where a point of fixation at which a person gazes is viewed in a quick, stable manner, extends over a horizontal range from about 60 to 90 degrees and a vertical range from about 45 to 70 degrees. In this case, when the point of fixation coincides with the target object OB, the effective field of view extends over the horizontal range of about 30 degrees and the vertical range of about 20 degrees around the lines of sight RD and LD, the stable field of fixation extends over the horizontal range of about 60-90 degrees and the vertical range of about 45-70 degrees around the lines of sight RD and LD, and the angular field of view extends over the horizontal range of about 200 degrees and the vertical range of about 125 degrees around the lines of sight RD and LD.

The actual field of view visually recognized by the user on whom the HMD 100 is mounted through the image display section 20 and further through the right optical image display section 26 and the left optical image display section 28 is called an actual field of view (FOV). In the configuration of the present embodiment shown in FIGS. 1 and 2, the actual field of view corresponds to a field of view actually visually recognized by the user through the right optical image display section 26 and the left optical image display section 28. The actual field of view is narrower than the angular field of view and the stable field of fixation, which have been described with reference to FIG. 3B, but wider than the effective field of view.

The camera 61 preferably has an angle of view that allows imaging over a range wider than the user's field of view. Specifically, the angle of view C is preferably wider than at least the user's effective field of view. More preferably, the angle of view C is wider than the user's actual field of view. Still more preferably, the angle of view C is wider than the user's stable field of fixation. Most preferably, the angle of view C is wider than the angular field of view of the user's two eyes.

The camera 61 may include what is called a wide-angle lens as the imaging lens so that imaging over a wide angle of view is achieved. The wide-angle lens may include a lens called a super-wide-angle lens or a semi-wide-angle lens or may be a fixed-focal-length lens or a zoom lens, or the camera 61 may include a lens group formed of a plurality of lenses.

FIG. 4 is a functional block diagram of portions that form the HMD 100.

The HMD 100 includes an interface 114, which connects a variety of external apparatus OA, which serve as content supply sources, to the HMD 100. The interface 114 can be an interface that supports wired connection, such as a USB interface, a micro-USB interface, and a memory card interface, and may instead be formed of a wireless communication interface. The external apparatus OA are each an image supply apparatus that supplies the HMD 100 with images and are, for example, a personal computer (PC), a mobile phone terminal, and a portable game console.

The control device 10 includes the control section 140, an input information acquisition section 110, and a storage section 120.

The input information acquisition section 110 is connected to an operation section 111. The operation section 111 includes the key operation section 11, the trackpad 14, the upward/downward-direction keys 15, and the changeover switch 16, as described above. The input information acquisition section 110 accepts the user's operation on the basis of a signal inputted via the operation section 111. The input information acquisition section 110 outputs data representing the content of the operation performed on the operation section 111 to the control section 140. Further, the input information acquisition section 110 may control the LED indicator 12 (FIG. 1) to cause it to go on, blink, and go off under the control of the control section 140.

The control device 10 further includes a power source section 130, which supplies the portions in the control device 10 and the image display section 20 with electric power. The state of the power supply from the power source section 130 is controlled by the control section 140 in accordance with operation of the power switch 18 (FIG. 1) and the situation of the program executed by the control section 140.

The storage section 120 is a nonvolatile storage device and stores a variety of computer programs and data associated with the programs. The programs include a program for achieving a control method according to the embodiment of the invention.

The storage section 120 may further store data on still images and motion images to be displayed in the image display section 20. The storage section 120 further stores setting data 121. The setting data 121 contains a variety of setting values used by the control section 140. The setting values contained in the setting data 121 may be values having been inputted in advance through operation of the operation section 111 or may be values received from any of the external apparatus OA or any other device (not shown) via a communication section 117 or the interface 114 and then stored.

The storage section 120 further stores content data 122, data for operation detection 125, and data for distance detection 127. The content data 122 contains image data on an image displayed by the image display section 20 under the control of the control section 140, such as a still image and a video. The content data 122 may contain voice data. The content data 122 may contain image data on a plurality of images. In this case, the plurality of images are not limited to images simultaneously displayed in the image display section 20.

A GPS 115 and the communication section 117 are connected to the control section 140.

The GPS 115 includes an antenna (not shown) and receives GPS (global positioning system) signals to calculate the current position of the control device 10. The GPS 115 outputs the current position and the current time determined on the basis of the GPS signals to the control section 140. The GPS 115 may have a function of acquiring the current time on the basis of information contained in the GPS signals to correct the time measured by the control section 140.

The communication section 117 performs wireless data communication that complies with wireless LAN (including WiFi (registered trademark)), Miracast (registered trademark), Bluetooth (registered trademark), or any other standard.

When any of the external apparatus OA is wirelessly connected to the communication section 117, the control section 140 acquires content data via the communication section 117 and causes the image display section 20 to display an image. On the other hand, when any of the external apparatus OA is wired to the interface 114, the control section 140 acquires content data via the interface 114 and causes the image display section 20 to display an image. The communication section 117 and the interface 114 function as a data acquisition section DA, which acquires content data from the external apparatus OA.

The control section 140 includes a CPU (not shown) that executes a program, a RAM (not shown) that temporarily stores the program executed by the CPU and data, and a ROM (not shown) that stores a basic control program executed by the CPU and data in a nonvolatile manner. The control section 140 reads and executes the computer programs stored in the storage section 120 to function as an operating system (OS) 150, an image processing section 160, an imaging control section 161, an AR display control section 164, an operation detection section 165, a target estimation section 167, a communication control section 170, the voice processing section 187, and a display control section 190.

The image display section 20 includes the camera 61. The image display section 20 further includes an interface 25, the right display driver 22, the left display driver 24, the right light guide plate 261 as the right optical image display section 26, the left light guide plate 262 as the left optical image display section 28, and a nine-axis sensor 66.

The nine-axis sensor 66 is a motion sensor (inertia sensor) that detects acceleration (three axes), angular velocity (three axes), and terrestrial magnetism (three axes). The nine-axis sensor 66 may be a sensor unit formed of a plurality of sensors integrated with one another. The control section 140 can detect motion of the head of the user on whom the image display section 20 is mounted on the basis of detection values from the nine-axis sensor 66.

The interface 25 is connected to the control device 10 via the connection cable 40 and outputs a variety of data and signals transmitted by the control device 10 to the right display driver 22 and the left display driver 24. The interface 25 further outputs a control signal transmitted from the display control section 190 to a corresponding right backlight control section 201 or left backlight control section 202.

The interface 25 connects the camera 61 and the nine-axis sensor 66 to the control device 140. Imaged data captured with the camera 61 and results of detection of acceleration (three axes), angular velocity (three axes), and terrestrial magnetism (three axes) from the nine-axis sensor 66 are sent to the control section 140 via the interface 25.

The right display driver 22 includes the right backlight 221, the right LCD 241, and the right projection system 251 described above. The right display driver 22 further includes the right backlight (BL) control section 201, which controls the right backlight (BL) 221, and a right LCD control section 211, which drives the right LCD 241.

The right backlight control section 201 drives the right backlight 221 in accordance with a control signal transmitted by the display control section 190. The right LCD control section 211 drives the right LCD 241 on the basis of a signal transmitted by the image processing section 160 and a signal transmitted by the display control section 190.

The left display driver 24 has the same configuration as that of the right display driver 22. The left display driver 24 includes the left backlight 222, the left LCD 242, and the left projection system 252 described above. The left display driver 24 further includes the left backlight control section 202, which drives the left backlight 222, and a left LCD control section 212, which drives the left LCD 242.

The left backlight control section 202 drives the left backlight 222 in accordance with a control signal transmitted by the display control section 190. The left LCD control section 212 drives the left LCD 242 on the basis of a signal transmitted by the image processing section 160 and a signal transmitted by the display control section 190.

The right backlight control section 201, the right LCD control section 211, the right backlight 221, and the right LCD 241 are also collectively referred to as a right "image light generation unit." Similarly, the left backlight control section 202, the left LCD control section 212, the left backlight 222, and the left LCD 242 are also collectively referred to as a left "image light generation unit."

The image processing section 160 generates signals to be transmitted to the right display driver 22 and the left display driver 24 on the basis of image data on a content to be displayed in the image display section 20. The signals generated by the image processing section 160 may be a vertical sync signal, a horizontal sync signal, a clock signal, an analog image signal, and other signals.

The image processing section 160 may perform, as required, resolution conversion in which the resolution of the image data is converted into resolution suitable for the right display driver 22 and the left display driver 24. The image processing section 160 may further perform image adjustment in which the luminance and chroma of the image data are adjusted, 2D/3D conversion in which 2D image data is created from 3D image data or 3D image data is created from 2D image data. Having performed the image processing described above, the image processing section 160 generates signals for displaying images on the basis of the processed image data and transmits the signals to the image display section 20 via the connection cable 40.

The display control section 190 produces control signals that control the right display driver 22 and the left display driver 24, and the control signals control the right display driver 22 and the left display driver 24 to cause them to produce and output image light. Specifically, the display control section 190 controls the right LCD control section 211 to cause it to start and stop driving the right LCD 241 and controls the right backlight control section 201 to cause it to start and stop driving the right backlight 221. The display control section 190 further controls the left LCD control section 212 to cause it to start and stop driving the left LCD 242 and controls the left backlight control section 202 to cause it to start and stop driving the left backlight 222.

The imaging control section 161 controls the camera 61 to cause it to perform imaging for generation of captured image data and temporary storage of the data in the storage section 120. In a case where the camera 61 is configured as a camera unit including a circuit that generates captured image data, the imaging control section 161 acquires the captured image data from the camera 61 and temporarily stores the data in the storage section 120.

A captured image acquired by the imaging control section 161 is processed by the operation detection section 165, the target estimation section 167, and other sections, as will be described later. As the orientation of the captured image to be processed, the bottom side of the captured image is used as a reference. In the present embodiment, an image captured with the camera 61 has a rectangular shape, and any of the four sides of the captured image is defined as the bottom side. The bottom side may be set in advance for all captured image data generated by the imaging control section 161, may be specified when the camera 61 performs imaging, or may be determined on the basis of the orientation of a captured image.

For example, the bottom side of a captured image may be determined in accordance with the upward/downward direction (direction of gravity) in the imaging performed by the camera 61 or the upward/downward direction related in advance to the camera 61, or additional data representing which side is defined as the bottom side may be added to captured image data. Instead, when the imaging control section 161 forwards a captured image to the operation detection section 165 or the target estimation section 167, data representing the orientation of the captured image may be added. In this case, the position of the bottom side can be identified on the basis of the orientation of the captured image. Still instead, the imaging control section 161 may determine the orientation of a captured image with the bottom side thereof facing downward and then generate captured image data.

To this end, the operation detection section 165 and the target estimation section 167 may carry out the process of identifying the bottom side of a captured image when they process the captured image. For example, each of the operation detection section 165 and the target estimation section 167 may always process a captured image after recognizing one of the long sides of the captured image, which has a rectangular shape, as the bottom side or may identify the bottom side of the captured image in accordance with additional data representing the orientation of the captured image or additional data representing the position of the bottom side of the captured image.

The operation detection section 165 detects operation performed on the HMD 100 on the basis of an image captured with the camera 61. The operation detection section 165 detects an image of the user's body in the image captured with the camera 61 to identify operation performed by the user's body.

The target estimation section 167 extracts images of objects from the image captured with the camera 61 to detect the objects (target objects) within the angle of view of the camera 61. Among the detected target objects, the target estimation section 167 estimates a target object that is a target of the operation identified by the operation detection section 165.

The AR display control section 164 controls the display operation performed by the image display section 20 to achieve AR display.

The AR display control section 164 generates an image for AR display to be displayed by the image display section 20. The AR display control section 164 may generate a planar image as the image for AR display. Instead, the AR display control section 164 may generate a stereoscopic image as the image for AR display. In this case, the AR display control section 164 generates an image for the right eye to be displayed in the right optical image display section 26 by the image display section 20 in correspondence with the right eye RE and an image for the left eye to be displayed in the left optical image display section 28 by the image display section 20 in correspondence with the left eye LE. The image for the right eye and the image for the left eye have parallax therebetween, and the parallax allows the user to visually recognize a stereoscopic image. Displayed image data formed of a planar image or a stereoscopic image generated by the AR display control section 164 is generated based, for example, on the content data 122 stored in the storage section 120 or an image captured with the camera 61. The AR display control section 164 carries out the process of determining the position where the generated image data is displayed in such a way that the image data is visually recognized in a position corresponding to the target object in the actual space and controls the display control section 190 in such a way that the image data is displayed in the determined display position.

In the process of determining the image display position, the AR display control section 164 may analyze the image captured with the camera 61 to determine the position where the user visually recognizes the operated target object estimated by the target estimation section 167. In this case, on the basis of the position of the operated target object in the angle of view of the camera 61, the AR display control section 164 determines the position of the operated target object with respect to the display region of the image display section 20. The AR display control section 164 displays letters and an image in accordance with the position of the operated target object. Specifically, the AR display control section 164 displays letters and an image in such a way that the letters and the image avoid the operated target object or overlap with the operated target object. The thus displayed image corresponds to what is called an image providing an AR effect (hereinafter referred to as AR image).

The AR display control section 164 may display an AR image after the target estimation section 167 detects an operated target object in an image captured with the camera 61 and estimates the detected image to be a target of the operation, or the AR display control section 164 may directly detect a target object that is a target of AR display in the captured image.

In the present embodiment, the AR display control section 164 sets an operated target object estimated by the target estimation section 167 to be a target of AR display.

The voice processing section 187 acquires a voice signal contained in the content, amplifies the acquired voice signal, and outputs the amplified voice signal to the right earphone 32 and the left earphone 34. The voice processing section 187 further acquires voice collected with the microphone 63 and converts the collected voice into digital voice data. The voice processing section 187 may perform preset processing on the digital voice data.

The thus configured HMD 100 captures an image of a range including at least part of the field of view of the user on whom the image display section 20 is mounted with the camera 61, detects the user's operation on the basis of the captured image, and estimates an operated target object having been operated. The HMD 100 then performs AR display corresponding to the operated target object having been operated by the user. For example, when the user touches an object or moves a hand toward the object, the HMD 100 can display, for example, a GUI in the form of an AR image in correspondence with the object. In this case, the user can use the GUI to perform operation, for example, of reading an image code attached to the object.

FIGS. 3A and 3B show the configuration in which the camera 61 is disposed roughly at the center in the width direction of the image display section 20 by way of example, but the position of the camera 61 is not limited to the position described above.

Figure 5A:
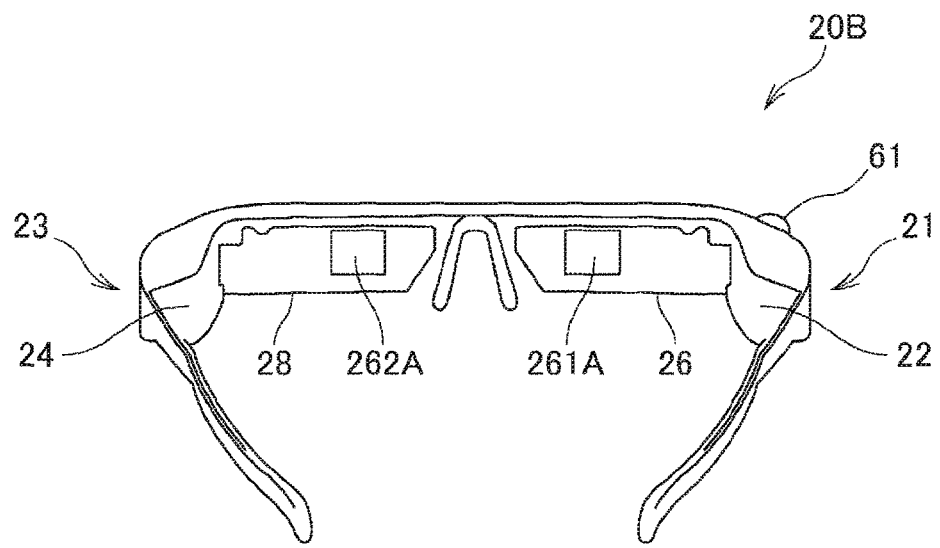
FIGS. 5A and 5B are descriptive diagram showing another example of the correspondence between the image display section and the imaging range.
Figure 5B:
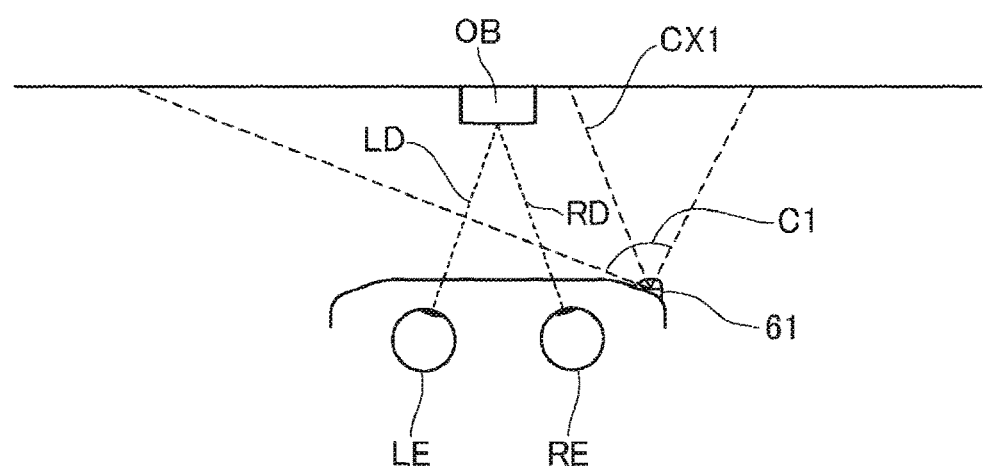
Figure 6A:
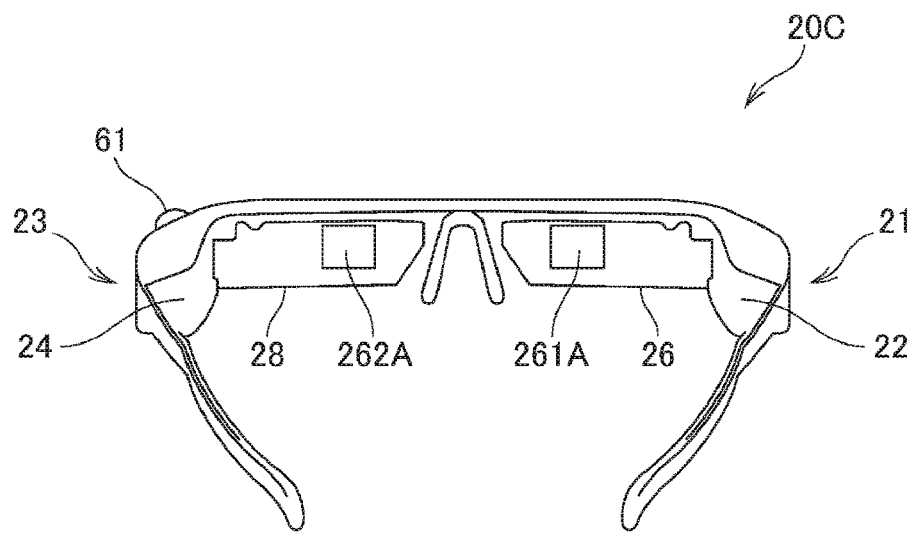
FIGS. 6A and 6B are descriptive diagram showing still another example of the correspondence between the image display section and the imaging range.
Figure 6B:
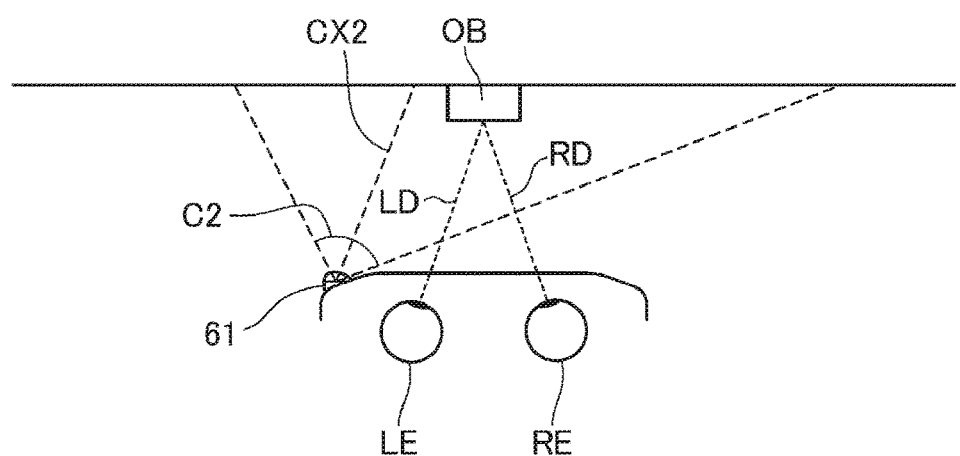

FIGS. 5A and 5B and FIGS. 6A and 6B show examples of the configuration of the image display section 20 with the camera 61 located at different positions. FIGS. 5A and 5B are key part configuration diagram of an image display section 20B with the camera 61 disposed in a right-side end portion, and FIGS. 6A and 6B are key part configuration diagram of an image display section 20C with the camera 61 disposed in a left-side end portion. FIG. 5A is a key part perspective view of the image display section 20B viewed from the side facing the user's head, and FIG. 5B describes the angle of view of the camera 61. FIG. 6A is a key part perspective view of the image display section 20C viewed from the side facing the user's head, and FIG. 6B describes the angle of view of the camera 61. In FIGS. 5A and 5B and FIGS. 6A and 6B, the connection cable 40 is omitted.

The viewed direction in FIGS. 5A and 6A corresponds to the viewed direction in FIG. 3A.

The camera 61 of the image display section 20B shown in FIG. 5A is disposed on the front surface of the image display section 20B and in an end portion facing the right holder 21.

In the image display section 20B, the optical axis CX1 of the camera 61 is oriented in a direction inclining leftward with respect to the direction toward a point in front of the image display section 20B, as shown in FIG. 5B. The angle of view C1 of the camera 61 therefore inclines leftward with respect to the direction toward a point in front of the camera 61 and has a range including points in front of the right eye RE and the left eye LE.

The camera 61 of the image display section 20C shown in FIG. 6A is disposed on the front surface of the image display section 20C and in an end portion facing the left holder 23.

In the image display section 20C, the optical axis CX2 of the camera 61 is oriented in a direction inclining rightward with respect to the direction toward a point in front of the image display section 20C, as shown in FIG. 6B. The angle of view C2 of the camera 61 therefore inclines rightward with respect to the direction toward a point in front of the camera 61 and has a range including points in front of the right eye RE and the left eye LE.

The position of the camera 61 in the image display section 20 and the direction and size of the angle of view of the camera 61 are arbitrarily changeable, as shown in FIGS. 5A and 5B and FIGS. 6A and 6B.

The angles of view C1 and C2 in the case where the camera 61 is disposed as shown in FIGS. 5A and 6A preferably have a range wider than the user's field of view, as in the case of the angle of view C described with reference to FIG. 3B. Specifically, the angles of view C1 and C2 are preferably wider than at least the user's effective field of view. The angles of view C1 and C2 are more preferably wider than the user's actual field of view. The angles of view C1 and C2 are still more preferably wider than the user's stable field of fixation.

Figure 7:
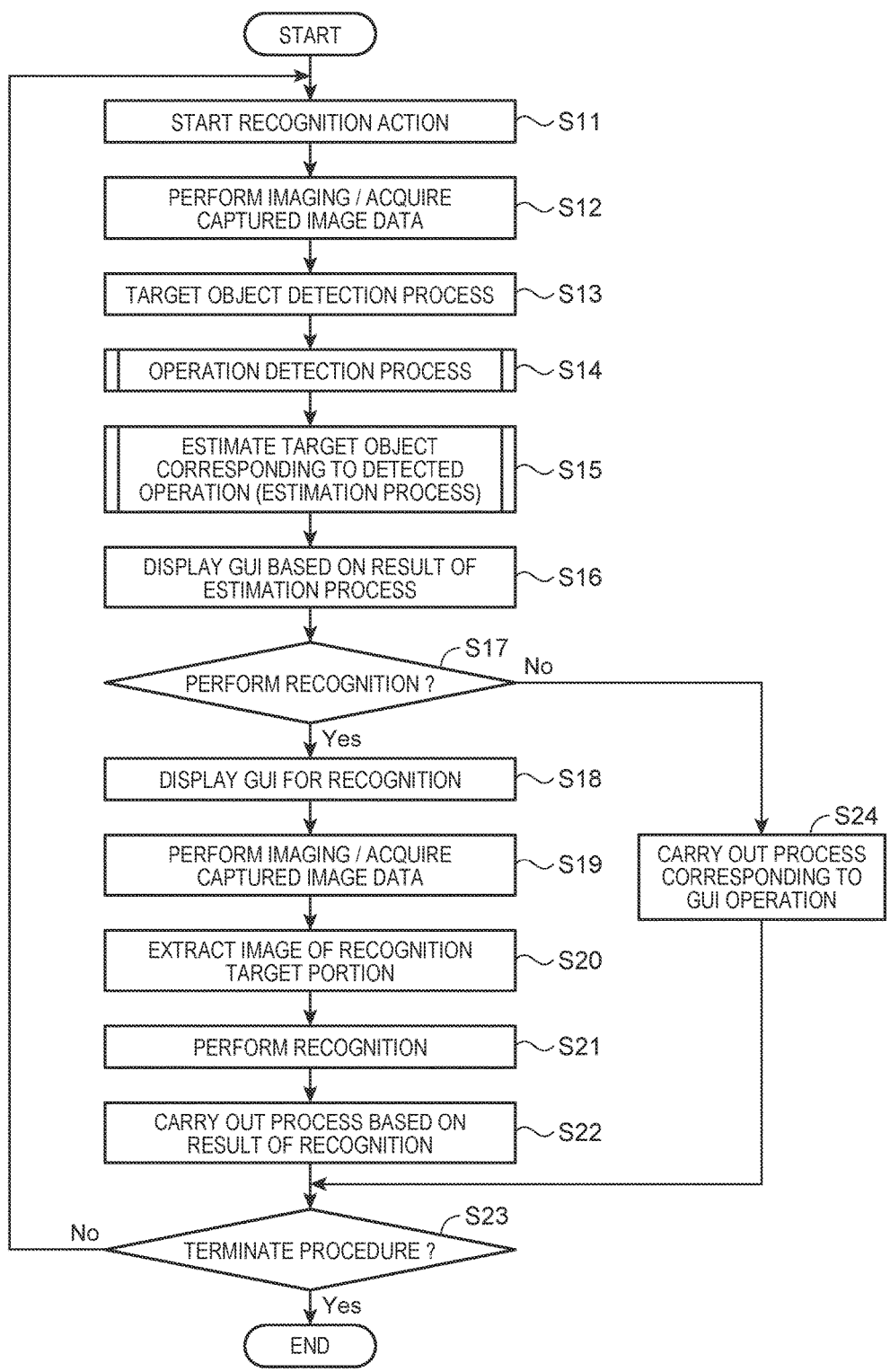
FIG. 7 is a flowchart showing the action of the HMD.

FIG. 7 is a flowchart showing the action of the HMD 100. In the example shown in FIG. 7, among objects present within the angle of view C of the camera 61, the control section 140 of the HMD 100 estimates an object which has been touched by the user with a hand or toward which the user has moved a hand and recognizes an image code recorded on the object.

FIGS. 8A to 8D show examples of an image displayed by the HMD 100 in the action shown in FIG. 7.

The control section 140 starts recognition action in response, for example, to the user's operation performed on the control device 10 (step S11). The imaging control section 161 controls the camera 61 to cause it to perform imaging for acquisition of captured image data (step S12).

Figure 8A:
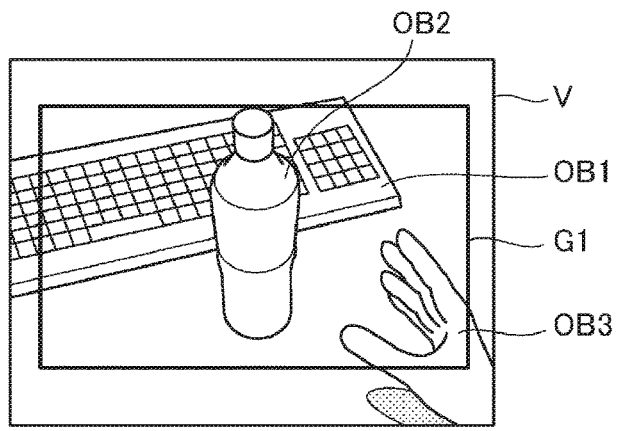
FIGS. 8A to 8D show examples of images displayed by the HMD.

FIG. 8A shows an example of an image displayed by the HMD 100 when the recognition action starts in step S11. In the field of view V of the user on whom the image display section 20 is mounted, a frame-shaped guide G1 is displayed over a predetermined range under the control of the control section 140. The guide G1 is formed of a straight line showing the user the range that is a target of the recognition process and corresponds, for example, to the imaging range of the camera 61. In the example shown in FIG. 8A, target objects OB1, OB2, and OB3 are present inside the guide G1. The target object OB1 is a keyboard on a desk. The target object OB2 is a bottle of a beverage. The target object OB3 is the right hand of the user who operates the other target objects.

The target estimation section 167 carries out a target object detection process of detecting the target objects displayed in the captured image (step S13). The target estimation section 167 detects, for example, a contour in the captured image to detect an image of each object contained in the captured image. The detected object is called a "target object" that is a candidate of the target of the operation.

On the basis of an image of an object detected as a target object or the amount of feature of the image of the object, the target estimation section 167 may detect the image of the object in the captured image. In this case, the image or the amount of feature of the image used by the target estimation section 167 may be contained, for example, in the setting data 121.

Further, the number of target objects to be detected in a captured image by the target estimation section 167 is not limited to a specific value. For example, the target estimation section 167 detects the target objects OB1, OB2, and OB3 in FIG. 8A in step S13.

The operation detection section 165 carries out an operation detection process of detecting the user's operation (step S14) on the basis of the image captured in step S12. The operation detection process will be described later in detail with reference to FIG. 10. In the operation detection process, the operation detection section 165 identifies a target object OB involved in the user's operation in the captured image.

The target estimation section 167 subsequently carries out an estimation process of estimating an operated target object that is a target of the operation detected by the operation detection section 165 in step S14 (step S15) among the target objects detected in step S13. The estimation process will be described later in detail with reference to FIG. 13.

Figure 8B:
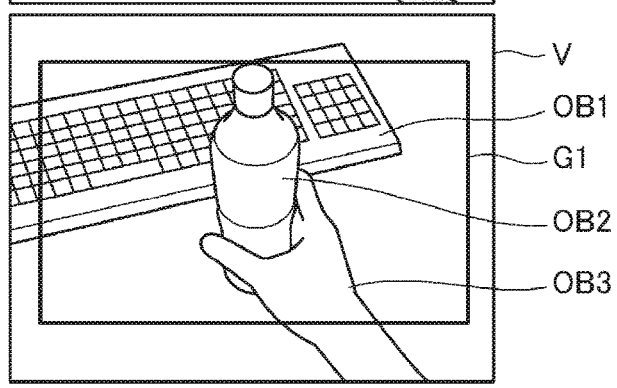

FIG. 8B shows a state in which the user has grabbed the bottle of a beverage with a hand. In the examples shown in FIGS. 8A and 8B, the target objects OB1, OB2, and OB3 are located within the angle of view of the camera 61 and detected by the target estimation section 167. Images of target objects detected in the captured image by the operation detection section 165 correspond to images of objects, and the target objects correspond to objects.

In the operation detection process, the operation detection section 165 determines that the user's hand is present within the angle of view of the camera 61 and the hand is equivalent to operation. The operation detection section 165 then detects the hand (target object OB3) as a target object involved in the user's operation.

Since the target object OB3 is in contact with the target object OB2 in the example shown in FIG. 8B, the target estimation section 167 estimates that the target object OB2 is the operated target object. The operated target object corresponds to a target object.

The AR display control section 164 displays a GUI on the basis of a result of the estimation process carried out by the target estimation section 167 (step S16). The GUI may include, for example, a message that prompts the user to perform input of whether or not the result of the estimation process carried out by the target estimation section 167 is correct. The GUI may instead include a message or an image that displays the result of the estimation process. The GUI may still instead include a message that requests the user to perform input of whether or not to carry out the recognition process on the basis of the estimation process. In the present embodiment, it is assumed that the GUI allows the user to issue an instruction to carry out a process other than the recognition process or an instruction to carry out the recognition process. The process other than the recognition process is, for example, the process of saving data on an image captured with the camera 61.

The control section 140 detects operation based on the GUI displayed in step S16 by the AR display control section 164 and evaluates whether or not the operation is an instruction to carry out the recognition process (step S17).

The operation by which the user instructs the operation detection section 165 to carry out the recognition process is, for example, operation of holding an operated target object with a hand and bringing the image code or any other portion of the operated target object, which is a target of the recognition process, to a predetermined position in the GUI. In this case, the user's operation of holding the operated target object with a hand and bringing the image code to the predetermined position may be determined as the operation that instructs the operation detection section 165 to carry out the recognition process (Yes in step S17). In contrast, in a case where the condition described above is not satisfied for at least a predetermined period after the user holds the operated target object with a hand, the operation may be determined not to be the operation that instructs operation detection section 165 to carry out the recognition process (No in step S17). The operation that instructs the operation detection section 165 to carry out the recognition process may instead be operation performed on the operation section 111 of the control device 10 or input in the form of voice detected by the voice processing section 187.

When the control section 140 determines that the operation that instructs the operation detection section 165 to carry out the recognition process has been performed (Yes in step S17), the AR display control section 164 displays a GUI for the recognition (step S18). At this point, the imaging control section 161 controls the camera 61 to cause it to perform imaging and acquire captured image data (step S19). The control section 140 extracts an image of a target portion where the recognition process is carried out from the captured image data produced by the camera 61 (step S20) and recognizes an image code (step S21).

The control section 140 subsequently carries out a process based on a result of the recognition (step S22) and evaluates whether or not the present procedure should be terminated (step S23). When a result of the evaluation shows that the present procedure should be continued (No in step S23), the control section 140 returns to step S11. When input operation or any other operation that instructs termination of the action of the control device 10 is performed (Yes in step S23), the control section 140 terminates the present procedure.

In a case where the operation performed on the basis of the GUI displayed in step S16 by the AR display control section 164 is not the operation that instructs the operation detection section 165 to carry out the recognition process (No in step S17), the control section 140 carries out a process corresponding to the operation (step S24) and proceeds to step S23.

In step S24, for example, menu operation using the GUI displayed in step S16 is performed. In this case, when the user's operation on the GUI instructs display of a menu, the control section 140 responds to the instruction and displays a list of setting items in a menu screen. At this point, a setting item is selected in the menu screen in accordance with the user's hand or operation performed on the operation section 111, and the selected setting item is set. Further, for example, the GUI displayed in step S16 is used to perform operation that instructs saving of the captured image data produced by the camera 61, and the control section 140 responds to the operation and stores the captured image data in the storage section 120.

Figure 8C:
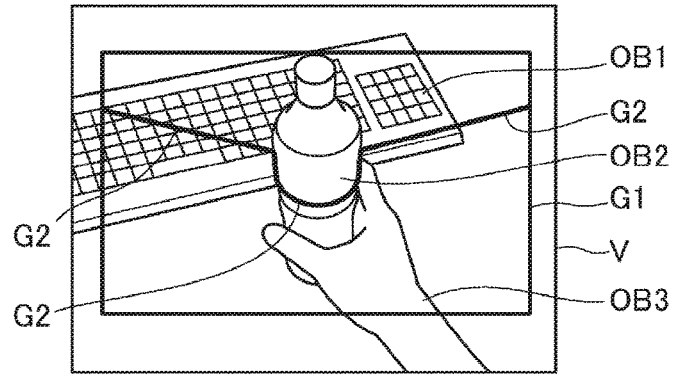

FIG. 8C shows an example of the GUI for the recognition process displayed in step S18. A recognition position guide G2 in FIG. 8C includes a straight line or a curved line displayed by the AR display control section 164. The recognition position guide G2 indicates the position where an image code is recognized, and when the recognition position guide G2 overlaps with the image code in an actual space recognized by the user through the image display section 20, the control section 140 reads the image code. The image code is not limited to a specific code and may be any image formed of coded information, such as a barcode, a QR (registered trademark) code, and other two-dimensional codes.

For example, in step S20, the control section 140 detects a pattern specific to the image code in the position where the image code overlaps with the recognition position guide G2 to extract a recognition target portion. Since the recognition position guide G2 only needs to be recognized in the field of view V, the recognition position guide G2 may, for example, be a straight line located in the guide G1. FIG. 8C shows an example in which the recognition position guide G2 is a line having a curved portion according to the shape of the target object OB2 estimated as the operated target object in step S15. The example shown in FIG. 8C mimics how the surface of a stereoscopic object irradiated with linear light is viewed, and the curved portion corresponding to the shape of the stereoscopic object and the recognition position guide G2 advantageously allow the user to readily understand the recognition position.

Figure 8D:
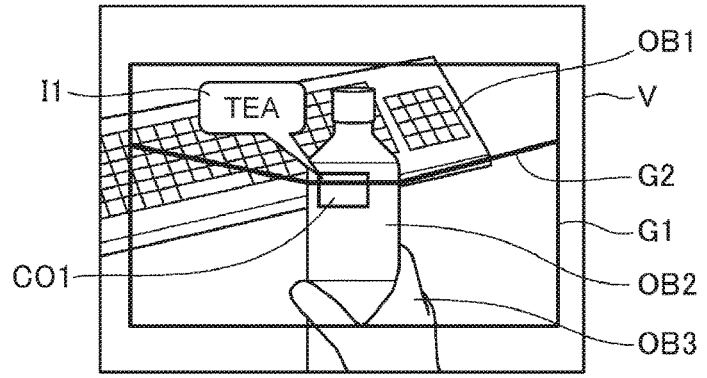

FIG. 8D shows another example of the displayed recognition position guide G2. In the example shown in FIG. 8D, the user grabs and lifts the target object OB2. In this state, the control section 140 reads an image code CO1 printed on the surface of the target object OB2 and obtains, for example, a JAN code for beverages. The control section 140 acquires information representing that the target object OB2 is a tea beverage on the basis of the JAN code and displays recognition result information I1, which represents that the target object OB2 is a tea beverage, in accordance with the position where the user visually recognizes the target object OB2. As shown in FIG. 8D, the user's action of grabbing and lifting the target object OB2 and bringing the image code CO1 to the position of the recognition position guide G2, which forms the GUI, corresponds to the operation that instructs the operation detection section 165 to carry out the recognition process in step S17 (FIG. 7).

Figure 9A:
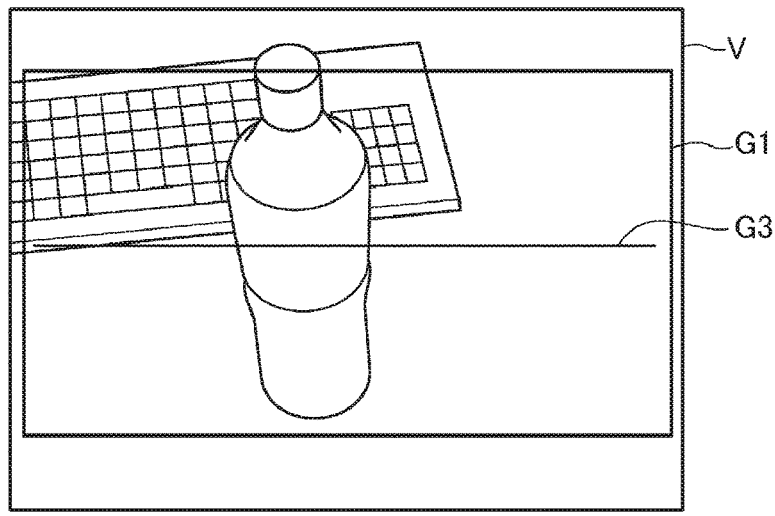
FIGS. 9A and 9B show other examples of images displayed by the HMD.
Figure 9B:
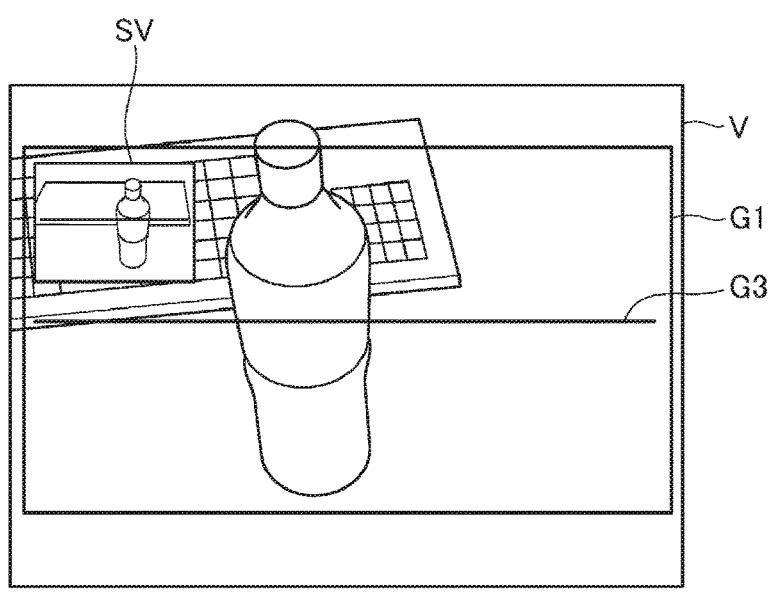

FIGS. 9A and 9B shows other examples of images displayed by the HMD 100.

In the example shown in FIG. 9A, when displaying the guide G1, the control section 140 further displays a guide G3 representing the center of the imaging range of the camera 61.

In the HMD 100, the relative positional relationship between the angle of view (imaging range) of the camera 61 and the half-silvered mirrors 261A and 262A, which are the display regions of the image display section 20, is determined by calibration in advance. The control section 140 can therefore display an image, such as the guides G1 and G3, in a position corresponding to the angle of view of the camera 61.

In the example shown in FIG. 9B, the guides G1 and G3 are displayed, and a secondary display section SV is further displayed under the control of the control section 140. The secondary display section SV is a region where an image captured with the camera 61 is displayed in roughly real time. In the example shown in FIG. 9B, the user can readily check whether or not an operated target object falls within the angle of view of the camera 61. The process of displaying the secondary display section SV is carried out, for example, by the imaging control section 161 and the AR display control section 164.

The guide G2 shown in FIGS. 8A to 8D and the guide G3 shown in FIGS. 9A and 9B are examples of the GUI displayed by the HMD 100, and the GUI to which the invention is applied is not limited to the aspects described above. For example, a GUI of an aspect in which the visibility of an operated target object is enhanced or a GUI of an aspect in which an operated target object attracts attention can be displayed. Specifically, an aspect in which the position or region corresponding to an object that is an operated target object estimated by the target estimation section 167 is colored, an aspect in which the position or the region is surrounded by a frame, an aspect in which letters representing that the operated target object has been recognized are added, or any other aspect can be employed. Further, the GUI may be formed of a single image or a plurality of images, may contain a text, may be combined with voice or any other sound, or may be so configured that the HMD 100 accepts operation performed on the GUI.

Figure 10:
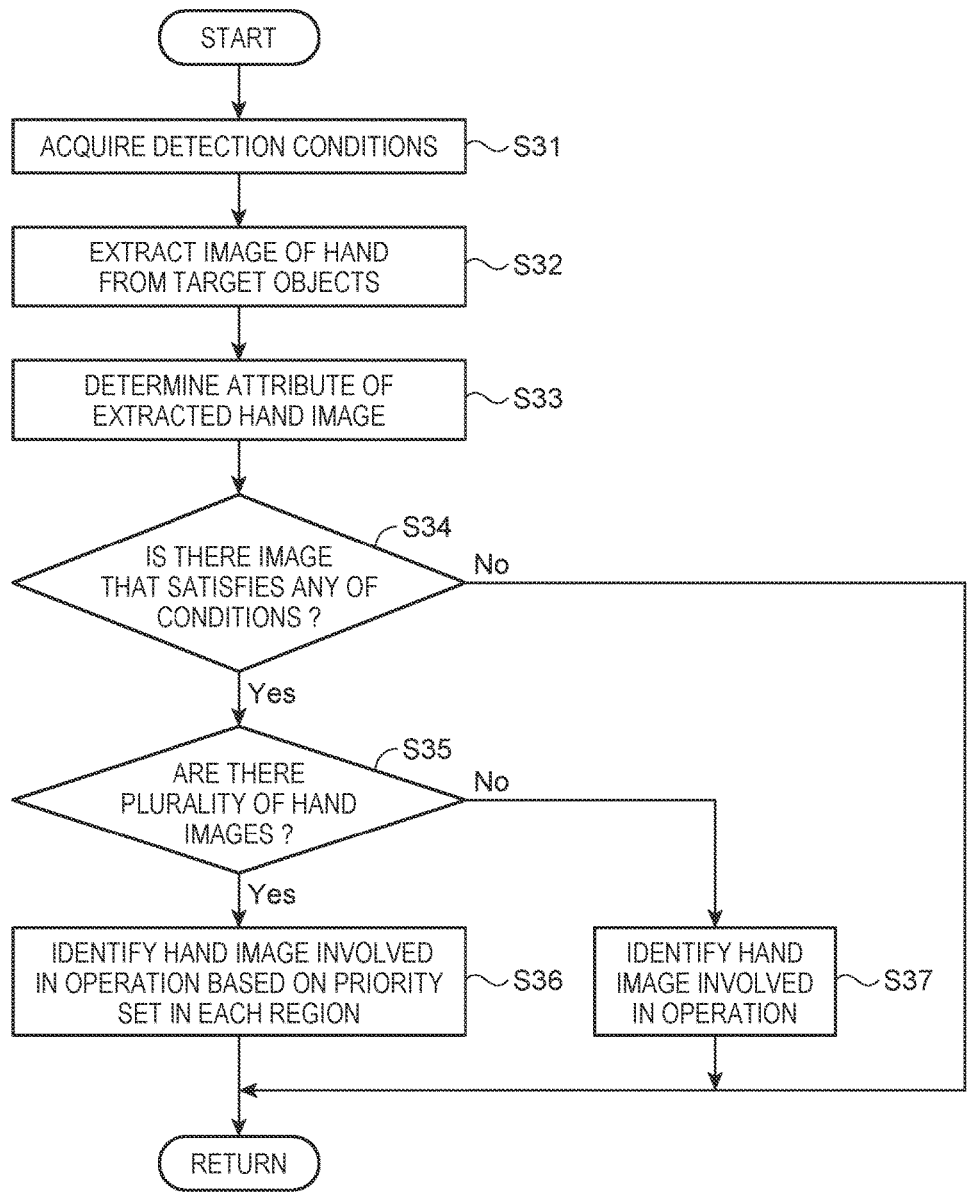
FIG. 10 is a flowchart showing an operation detection process carried out by the HMD.
Figure 11A:
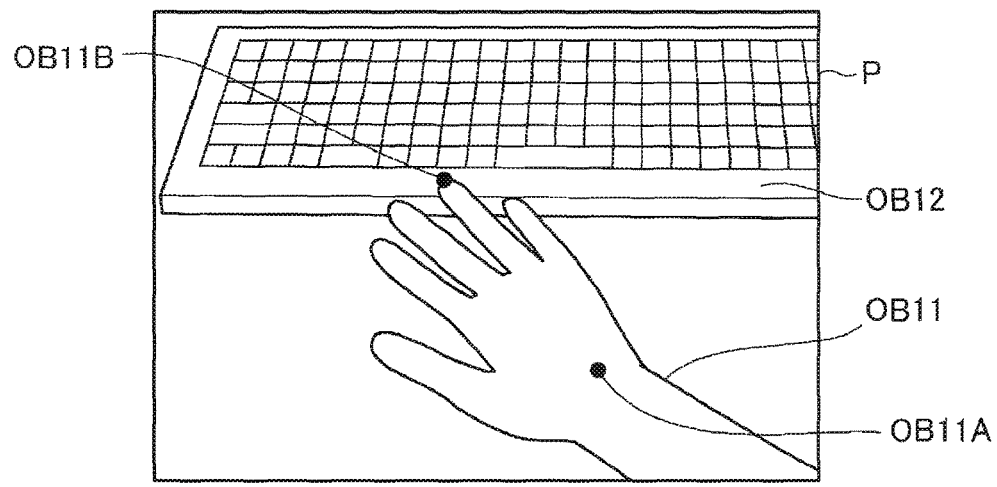
FIGS. 11A and 11B show examples of the operation detection process based on a captured image.
Figure 11B:
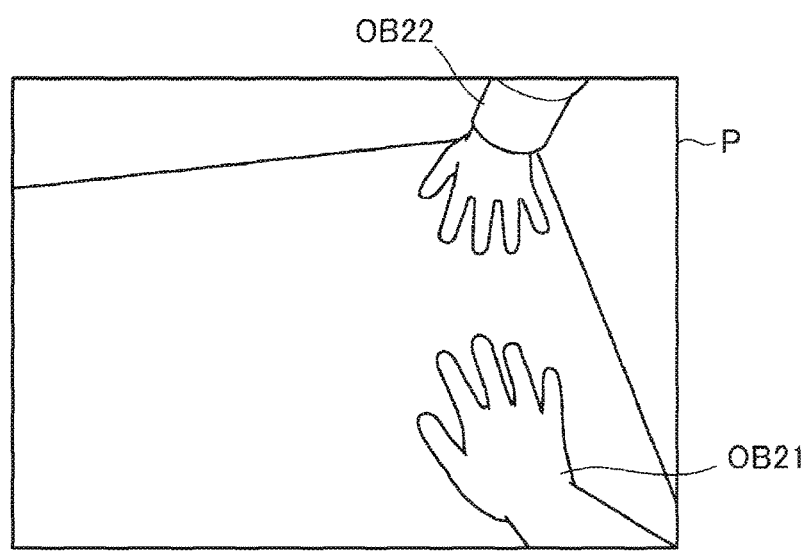

FIG. 10 is a flowchart showing the operation detection process shown in step S14 in FIG. 7 in detail. FIGS. 11A and 11B describe the operation detection process and show images captured with the camera 61 and the content of the process carried out by the operation detection section 165.

The HMD 100 stores the data for operation detection 125 in advance, which is data for detecting the operation in the image captured with the camera 61. In the operation detection process, the operation detection section 165 acquires the data for operation detection 125 from the storage section 120 (step S31).

The operation detection section 165 extracts an image of a person's hand and/or fingers (step S32) from the target objects detected in the captured image by the target estimation section 167 in step S13 in accordance with the detection conditions acquired in step S31. In the present embodiment, the following case is assumed: Operation performed by a hand of the user who has the image display section 20 mounted on the head (on the face) is detected; and part of the user's body involved in the operation is limited to a hand. Operation performed by a foot can also be detected. In this case, the process of extracting an image of the foot may be carried out in step S32. Information that specifies a body site or any other object to be detected may be contained, for example, in the data for operation detection 125.

The operation detection section 165 determines an attribute of the image extracted in step S32 (step S33). Examples of the attribute of the image are shown as follows.

(1) Distance from camera 61 to hand in extracted image (2) Whether or not the extracted image contains a plurality of images of hands separate from the camera 61 by different distances (3) Whether the hand in the extracted image is the right or left hand and correspondence between the hand and the position where the image is extracted (4) Correspondence between the extracted image and the edge of the captured image The attributes of an image will be described in detail.

In the examples of (1) and (2), the operation detection section 165 calculates the distance from the camera 61 to the hand on the basis of the size of the extracted image. Information for calculation of the distance is contained, for example, in the data for operation detection 125. With regard to the function of calculating the distance from the camera 61 to the hand, the operation detection section 165 corresponds to a distance detection section.

The operation detection section 165 has a function of calculating the distance from the image display section 20 to a target object OB detected in the captured image. The distance calculated by the operation detection section 165 is the distance between the hand, which the user's body, and a target object that is an object other than the user's body.

The operation detection section 165 determines the distance from the imaging plane of the camera 61 on the basis of the size of the image of the target object OB in the captured image and an imaging condition of the camera 61. In this process, the operation detection section 165 refers to the data for distance detection 127. The data for distance detection 127 can, for example, be configured to contain data, a computation expression, or any other information that relates the size of the image of the target object OB in the captured image, the imaging condition of the camera 61, and the distance from the camera 61. The imaging condition of the camera 61 is, for example, the zoom magnification.

To evaluate the attributes (1) and (2), the operation detection section 165 evaluates whether or not the distance from the hand corresponding to the hand image extracted in step S32 to the camera 61 is smaller than or equal to a reference value set in advance. The reference value is contained, for example, in the data for operation detection 125.

FIG. 11A shows an example in which the target estimation section 167 detects target objects OB11 and OB12 in a captured image P and the operation detection section 165 extracts an image of the target object OB11, which is a hand, out of the two target objects. The target object OB11 is an image of the user's right hand. The operation detection section 165 determines the distance from a position OB11A, which corresponds to the center of the target object OB11 (which may be replaced with the center of gravity of target object OB11) to the camera 61. The position OB11A is the center or the center of gravity of OB11 (hand) and corresponds to the position of the arm. The operation detection section 165 may instead detect a fingertip in the image of the target object OB11 and determine the distance from a position OB11B corresponding to the fingertip to the camera 61.

To evaluate the attribute (1), the operation detection section 165, for example, evaluates whether the distance from the position OB11A, which corresponds to the center (which may be replaced with the center of gravity) to the camera 61 is smaller than or equal to the reference value or greater than the reference value. Instead, the distance from the position in the extracted image that is farthest from the lower edge (bottom side) of the captured image P to the camera 61 may be compared with the reference value.

In a case where the distance from the camera 61 to the hand is greater than the reference value, the hand is unlikely to be the user's hand. The operation detection section 165 can therefore evaluate whether the extracted hand image is an image of a hand of the user on whom the HMD 100 is mounted or an image of another person's hand on the basis of whether nor not the distance from the camera 61 to the hand is smaller than or equal to the reference value. That is, the operation detection section 165 can evaluate whether or not the hand image extracted by the operation detection section 165 is an image relating to the user's operation.

The operation detection section 165 may instead carry out the process of detecting or identifying the bottom side of the captured image outputted by the imaging control section 161. That is, in a case where the bottom side of the captured image P differs from the lower edge of the captured image P, the distance from the position in the extracted image that is farthest from the bottom side of the captured image P to the camera 61 can be compared with the reference value. For example, even when the orientation of the captured image acquired by the operation detection section 165 is rotated counterclockwise by 90 degrees, the process described above can be carried out with reference to the bottom side of the image actually captured with the camera 61.

To evaluate the attribute (2), the operation detection section 165 determines the distances from the camera 61 to a plurality of positions in the extracted image. For example, in FIG. 11A, the operation detection section 165 determines the distances from the camera 61 to the position OB11A, which is the center or the center of gravity of the target object corresponding to the extracted image, and the position OB11B located at the upper end of the extracted image. The operation detection section 165 evaluates whether the difference between the determined distances is smaller than or equal to a threshold set in advance (smaller than or equal to predetermined distance) or greater than the threshold. In a case where an image of a hand of the user on whom the HMD 100 is mounted is captured with the camera 61, the user's hand is unlikely to be located only at a single location separate away from the camera 61, but the arm (OB11A) is located in a position close to the camera 61 and the fingertip (OB11B) is separate away from the camera 61 in most cases. Therefore, in a case where the extracted image contains a plurality of points separate from the camera 61 by different distances, it can be said that the extracted hand image is likely to be an image of the user's hand. The operation detection section 165 can therefore evaluate whether or not the extracted image is an image relating to the user's operation on the basis of whether or not the distances from the camera 61 to the plurality of positions contained in the hand image extracted by the operation detection section 165 differ from one another by values greater than the threshold.

Regarding the attribute (3), the operation detection section 165 evaluates whether the hand image extracted in step S32 is a right hand image or a left hand image. The operation detection section 165 analyzes the shape of the extracted hand image. Instead, in a case where information representing patterns of human right and left hand images is contained in the data for operation detection 125, the operation detection section 165 performs pattern matching to evaluate whether the hand image is a right hand image or a left hand image.

In the process in which the operation detection section 165 detects an image of the user's body in the image captured with the camera 61 and the process in which the target estimation section 167 detects a target object in the captured image, which will be described later, the operation detection section 165 and the target estimation section 167 use data on images or data on the amount of feature of each of the images stored in advance in the storage section 120.

The operation detection section 165 uses images of the user's fingers, hands, arms, feet, and other sites or the amount of feature of each of the images to analyze the captured image to detect an image of the user's body in the captured image. The data containing the images or the amount of feature of each of the images are stored as the data for operation detection 125 in the storage section 120. The data for operation detection 125 contains images of persons' fingers, hands, arms, feet, and other body sides or the amount of feature of each of the images and may be generic data or data that match body features of a specific person.

In a case where the user's own hands are contained in the captured image P, the right hand is displayed in a right portion of the captured image P, and the left hand is displayed in a left portion of the captured image P. The operation detection section 165 therefore evaluates whether the hand image extracted in step S32 is a right or left hand image, evaluates whether the position of the hand image is, for example, on the right or left of the center in the width direction of the captured image P, and when results of the two types of evaluation do not agree with each other, the operation detection section 165 can determine that the extracted hand image is not an image of the user's own hand.

Regarding the attribute (4), the operation detection section 165 extracts the boundary of the hand image extracted in step S32 and evaluates whether or not the boundary overlaps with the edge of the captured image P. In the case where an image of a hand of the user on whom the HMD 100 is mounted is captured with the camera 61, the user's hand is unlikely to be located only at a single location separate away from the camera 61, but the user's hand extends from the outside of the imaging range of the camera 61 into the imaging range. Therefore, in a case where the extracted image reaches the edge of the captured image P, that is, in a case where the extracted image overlaps with the edge, it can be said that the extracted image is likely to be an image of the user's hands. The operation detection section 165 can therefore evaluate whether or not the hand image extracted by the operation detection section 165 is an image relating to the user's operation on the basis of whether the extracted image overlaps with the edge of the captured image P. In this process, the target used in the evaluation may be limited to the right and left edges and the lower edge of the captured image P among the upper, lower, right, and left edges thereof. The reason for this is that it is very rare that the user's hand overlaps only with the upper edge (top side) of the captured image P.

Which of the attributes (1) to (4) is used as the reference to evaluate whether the hand image extracted in step S32 is an image of the user's hand is specified by the data for operation detection 125. For example, the evaluation may be performed with reference to all the attributes (1) to (4), or only part of the attributes may be used in the evaluation.

As a result of the evaluation in step S33, the operation detection section 165 evaluates whether or not there is a hand image that satisfies any of the conditions of an image relating to the user's operation (step S34). In a case where there is no satisfying image (No in step S34), the operation detection section 165 terminates the present procedure because there is no image involved in the operation.

In a case where there is a hand image that satisfies any of the conditions of an image relating to the user's operation (Yes in step S34), the operation detection section 165 evaluates whether or not there are a plurality of satisfying hand images (step S35).

In a case where there are a plurality of satisfying hand images (Yes in step S35), the operation detection section 165 identifies regions containing the images having been determined as satisfying images in the captured image P and identifies an image involved in the operation on the basis of priority set on a region basis (step S36).

For example, in a case where a plurality of target objects OB21 and OB22, each of which is a hand image, are contained in the captured image P, as shown in FIG. 11B, one of the images is likely to be an image of the user's hand, and the other is likely to be an image of another person's hand. Further, even when both the target objects OB21 and OB22 are images of the user's hands, the two hands are not necessarily involved in the user's operation.

The operation detection section 165 narrows the hand images contained in the captured image P to a smaller number of images involved in the operation and preferably identifies one image.

Figure 12:
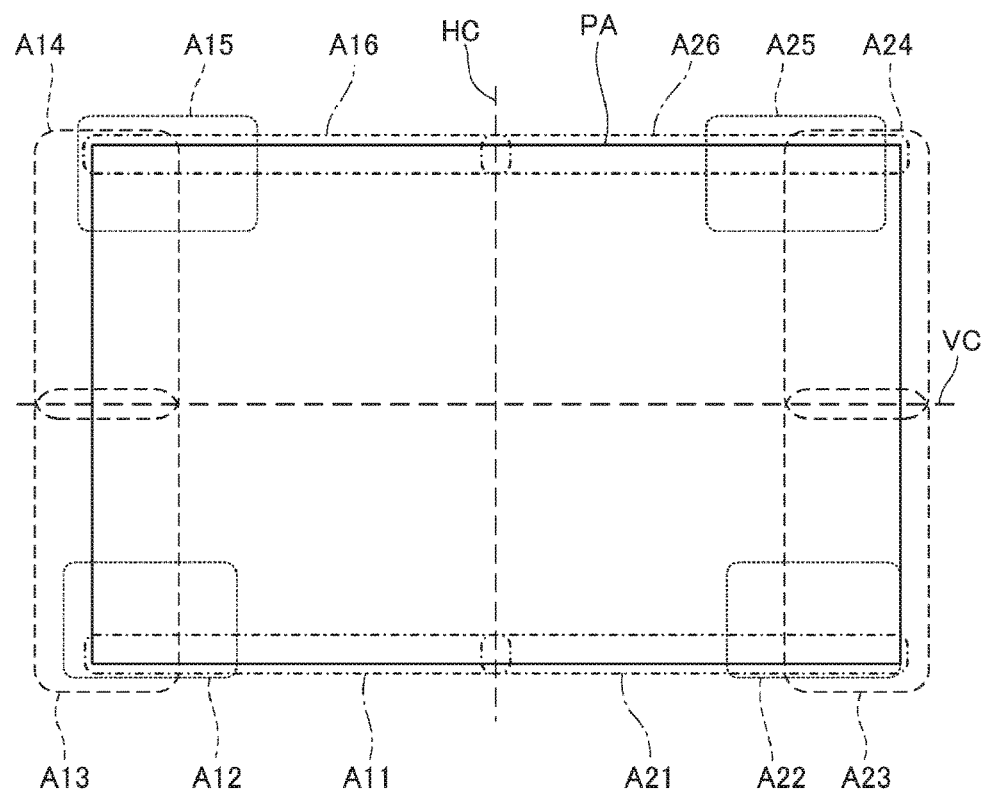
FIG. 12 is a descriptive diagram showing an example of setting on regions in the captured image.

FIG. 12 shows an example of the priority set in the captured image P.

An image region PA shown in FIG. 12 corresponds to the entire captured image P. In the image region PA are set regions A11 to A16 and A21 to A26. Each of the regions is set with respect to a position in the image region PA.

The regions A11 to A16 are set on the left of the center HC in the width direction of the image region PA, and the regions A21 to A26 are set on the right of the center HC in the width direction. Part of the regions extends across the center HC in the width direction.

The regions A11 and A21 overlap with the lower edge of the image region PA. The region A12 contains the lower left corner of the image region PA, and the region A22 contains the lower right corner of image region PA. The region A15 contains the upper left corner of the mage region PA, and the region A25 contains the upper right corner of image region PA. The region A13 contains the left edge of the image region PA and contains roughly the portion lower than the center VC in the upward/downward direction, and the region A14 contains the left edge of the image region PA and contains roughly the portion upper than the center VC in the upward/downward direction. The region A23 contains the right edge of the image region PA and contains roughly the portion lower than the center VC in the upward/downward direction, and the region A24 contains the right edge of the image region PA and contains roughly the portion upper than the center VC in the upward/downward direction. The regions A16 and A26 overlap with the upper edge of the image region PA.

Comparison among the positions of the regions on the basis of the positions of the centers of gravity of the regions shows that the regions A11, A12, A13, A14, A15, and A16 are arranged in this order from below in the left portion of the image region PA. Similarly, the regions A21, A22, A23, A24, A25, and A26 are arranged in this order from below in the right portion of the image region PA.

The data for operation detection 125 specifies the priority in accordance with which an image involved in the user's operation is identified in such a way that the priority decreases in the order of the regions A11>A12>A13>A14>A15>A16 in the left portion of the image region PA. Similarly, in the right portion of the image region PA, the priority is so specified as to decrease in the order of the regions A21>A22>A23>A24>A25>A26.

Further, in consideration of the rightward/leftward direction, the priority may be so specified as to decrease in the order of the regions A21>A11>A22>A12>A23>A13>A24>A14>A25>A15>A26>A16. This order is useful in a case where the user is right-handed. In a case where the user is left-handed, the priority may be so specified as to decrease in the order of the regions A11>A21>A12>A22>A13>A23>A14>A24>A15>A25>A16>A26. In the HMD 100, in a case where the user's right-handedness or left-handedness is set in advance or automatically set, the operation detection section 165 may switch the order in which the priority decreases in accordance with the setting.

The operation detection section 165 identifies a region corresponding to each image having been determined in step S33 to have an attribute satisfying any of the conditions and compares the priorities set in the regions corresponding to the images with one another. In a case where an extracted image extends over a plurality of regions, for example, a region where the center of gravity or the center of the image is located may be set as the corresponding region. Instead, a region having the highest priority among regions that overlap with the image may be set as the corresponding region.

As a result, even when the captured image P contains a plurality of hand images, the operation detection section 165 can appropriately identify a hand image involved in the user's operation.

In a case where the number of hand images that satisfy any of the conditions is one (No in step S35), the operation detection section 165 identifies the satisfying hand image as a hand image involved in the operation (step S37).

In the example shown in FIGS. 10 to 12, the case where the user detects operation performed by using the user's own body (hand) is presented. Instead, the operation detection section 165 may detect operation in which the user uses an operation body that is an object held by the user with a hand or operation in which the user uses an operation body mounted on the user's body, clothing, or any other site. Examples of the operation body may include a screwdriver and other tools and a pointing stick.

In the case where the operation detection section 165 detects an operation body held by the user with a hand, the operation body is detected as an object other than the user's hands by the operation detection section 165 in the captured image. The operation detection section 165 detects an image of the user's body in the captured image and then detects, as the operation body, an object located in a predetermined position with respect to the detected user's body. In this case, the operation detection section 165 considers the detected operation body as part of the user's body and can therefore detect operation performed by the operation body. An object located in a predetermined position with respect to the user's body can be identified on the basis of certain conditions. For example, the following two conditions are set in advance: (condition 1) the distance between the user's body (hand, for example) and the operation body is smaller than or equal to a predetermined value; and (condition 2) the captured image contains an image of the operation body continuous with an image of the user's body (hand, for example). In this case, the operation detection section 165 can detect or estimate an operation body that satisfies both the (condition 1) and the (condition 2). Regarding the (condition 1), to determine the distance between an object displayed in the captured image and the user's body, the approach described with reference to the process in which the operation detection section 165 evaluates the attribute (1) of an image can, for example, be applied. The state in which an image of the user's body and an image of the operation body are continuous with each other in the captured image may include a case where an image of the user's clothing or any other site is continuous with an image of the operation body.

In the action shown in FIG. 10, the process in step S32 in which the operation detection section 165 extracts a hand image may be carried out in step S13 (FIG. 7). Further, the processes in steps S31 to S37 may be carried out before step S13.

In step S13, the target estimation section 167 may detect all objects the contours of which can be extracted from the captured image as target objects. Instead, objects to be extracted as target objects from the captured image may be limited. In this case, in a case where the captured image contains images of a plurality of objects, the processing burden on the target estimation section 167 can be advantageously reduced. In this case, for example, the operation detection section 165 may detect an image of the user's hand in the captured image, and the target estimation section 167 may detect an object close to the hand image detected by the operation detection section 165 as a target object.

Instead, in step S13, the target estimation section 167 may narrow objects to be processed on the basis of a keyword contained in the user's current voice, the history of objects detected as target objects in the past, or any other information and then detect an object as a target object in the captured image.

Figure 13:
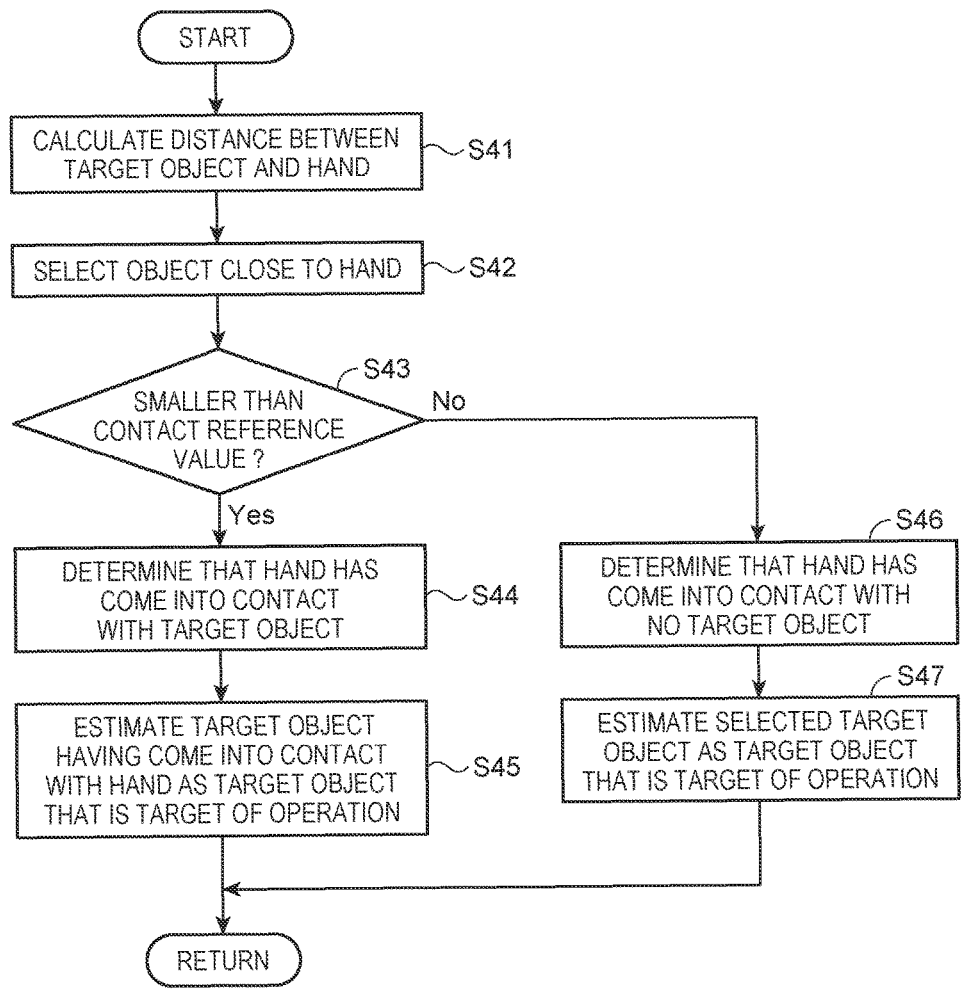
FIG. 13 is a flowchart showing an estimation process carried out by the HMD.
Figure 14A:
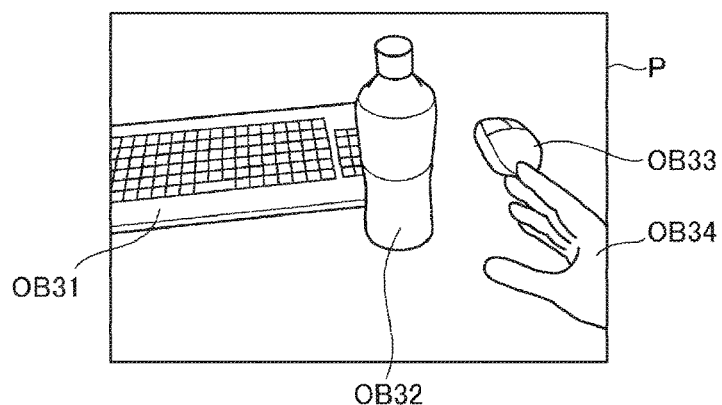
FIGS. 14A to 14C show an example of the estimation process based on a captured image.
Figure 14B:
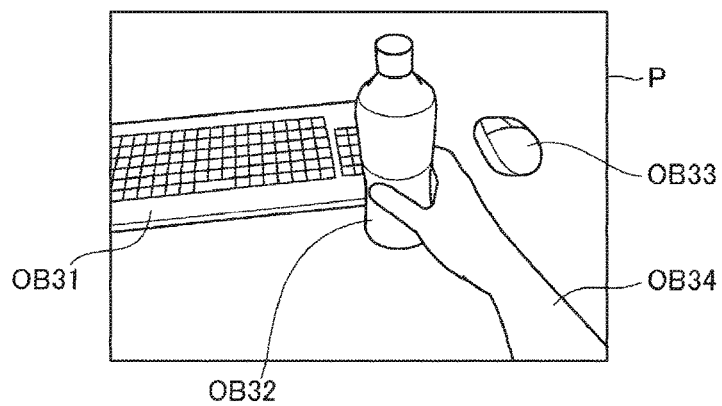
Figure 14C:
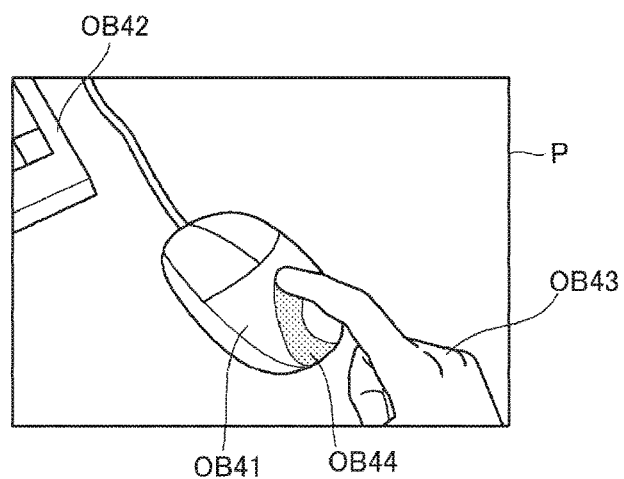

FIG. 13 is a flowchart showing details of the estimation process shown in step S15 in FIG. 7. FIGS. 14A to 14C are descriptive diagrams showing how the estimation process proceeds and show a captured image P captured with the camera 61 and a target object OB detected in the captured image P.

Before the estimation process shown in FIG. 13, the target estimation section 167 acquires an image identified by the operation detection section 165 in the operation detection process (FIG. 10). The image is an image identified by the operation detection section 165 as a hand image involved in the user's operation.

The target estimation section 167 calculates the distance between the target object OB detected in step S13 (FIG. 7) and the hand identified by the operation detection section 165 on the basis of the captured image (step S41). In step S41, the target estimation section 167 refers to the data for distance detection 127 and calculates the distance in consideration of the imaging condition of the camera 61. In the case where images of a plurality of target objects OB are detected in the captured image in addition to the hand image, the target estimation section 167 calculates the distance between each of the target objects OB and the hand.

In the example shown in FIG. 14A, images of target objects OB31, OB32, OB33, and OB34 are detected in the captured image P. The image of the target object OB34 is an image identified by the operation detection section 165 as a hand image involved in the operation. For example, the target object OB34 is identified as an image of the user's hand on the basis of the shape of the image of the target object OB34, an attribute representing that the target object OB34 contains the edge of the image, an attribute representing that the target object OB34 is located at a lower right portion of the image, and other attributes.

The target estimation section 167 calculates the distance between each of the target objects OB31, OB32, and OB33 and the target object OB34 in step S41.

The target estimation section 167 selects an image of the target object closest to the hand involved in the operation on the basis of the distances calculated in step S41 (step S42).

The target estimation section 167 evaluates whether or not the distance between the selected target object and the hand involved in the operation is smaller than a contact reference value set in advance (step S43). The contact reference value is a value that serves as a distance threshold that allows the target object to be considered in contact with the hand and is contained, for example, in the data for operation detection 125.

The distance calculated by the target estimation section 167 and used in the evaluation can, for example, be the distance between a position on the selected target object and a position on the hand involved in the operation with the positions closest to each other. In the example shown in FIG. 14A, a first point closest to the target object OB32 in the image of the target object OB34, which is the user's hand, and a second point closest to the target object OB34 in the image of the target object OB32 may be identified, and the distance between the first point and the second point may be determined. Instead, for example, the target estimation section 167 may determine the distance between the position of the center or the center of gravity of the image of the selected target object and the position of the center or the center of gravity of the image of the hand involved in the operation and evaluate the distance.

In the example shown in FIG. 14B, the target object OB32, which is closest to the target object OB34, which is the hand involved in the operation, is in contact with the hand. The target object OB32 is selected as the target object closest to the hand.

In a case where the distance between the selected target object and the hand involved in the operation, that is, the difference in the relative positions thereof is smaller than the contact reference value set in advance (smaller than or equal to predetermined distance) (Yes in step S43), the target estimation section 167 determines that the target object comes into contact with the hand (step S44). The target estimation section 167 estimates the target object determined to have come into contact with the hand as a target object that is a target of the operation (step S45).

In the example shown in FIG. 14B, the target object OB32 is estimated as a target object that is a target of the operation, and an image code printed on the surface of the target object OB32 is read or otherwise processed.

In a case where the distance between the selected target object and the hand involved in the operation is greater than or equal to the contact reference value (No in step S43), the target estimation section 167 determines that the hand is not in contact with the target object (step S46). The target estimation section 167 estimates the target object selected in step S42 as a target object that is a target of the operation (step S47).

When a result of the evaluation in step S43 shows that the distance between the target object and the hand is smaller than the contact reference value and when the result shows that the distance is not, the target estimation section 167 estimates a target object that is a target of the operation. Whether or not the hand has come into contact with the target object that is a target of the operation is reflected, for example, in the content of the GUI displayed in step S16 (FIG. 7). In this case, in accordance with whether or not the hand has come into contact with the target object that is a target of the operation, the AR display control section 164 may display a different GUI.

When a result of the evaluation shows that the distance between the target object and the hand is not smaller than the contact reference value (No in step S43), the target estimation section 167 may determine that no target object that is a target of the operation is present.

A method that allows the target estimation section 167 to evaluate whether or not the hand has come into contact with a target object that is a target of the operation is not limited to the method for evaluating the distance between the target object and the hand.

For example, the target estimation section 167 may detect an image of a shadow located in the vicinity of the image identified as an image of the hand involved in the operation in the captured image and evaluate whether or not the contact has been made on the basis of the positional relationship between the image of the shadow and the image of the hand.

In the example shown in FIG. 14C, as a target object OB44, a shadow is detected in the vicinity of the image of the target object OB43 identified as the hand involved in the operation. The image of the target object OB44 is in contact with the image of the target object OB43 in a position where the two images overlap with the image of the target object OB41. That is, since the image of the hand and the image of the shadow of the hand are in contact with each other on the target object OB41, the operation detection section 165 can determine that the target object OB43, which is the hand, is in contact with the target object OB41.

Further, a body mounted detection apparatus (not shown) that incorporates a myogenic potential sensor that detects myogenic potential in the muscle of the user's arm may be mounted on the user's arm. In this case, the body mounted detection apparatus and the image display section 20 or the control device 10 may be connected to each other, for example, in short-range wireless communication, and the control section 140 acquires and evaluates a detection value from the myogenic potential sensor that shows the detection state of the body mounted detection apparatus. In this configuration, the target estimation section 167 can detect on the basis of the detection value from the myogenic potential sensor that the user's hand has grabbed, lifted, pushed, or otherwise manipulate a target object that is a target of the operation. The target estimation section 167 can therefore detect that the user's hand has come into contact with a target object that is a target of the operation and manipulated the target object.

As described above, the HMD 100 according to the embodiment to which the invention is applied includes the camera 61, which performs imaging over a range including at least part of the user's field of view. The control section 140 detects the user's operation on the basis of an image captured with the camera 61 and estimates an image of a target object that is an operated target object from an image contained in the captured image in accordance with the detected operation.

According to the HMD 100 as an information processing apparatus and the information processing method executed by the HMD 100, the user's operation can be detected on the basis of the captured image produced by performing imaging over the range including the user's field of view, and an image of a target object that is an operated target object can be estimated in accordance with the detected operation. Therefore, processing the captured image allows selection of an image of a target object that is an operated target object, resulting in light-burden processing. Further, the program for achieving the information processing method is stored in the form executable by a computer that forms the control section 140 in the storage section 120 or a nonvolatile storage section or any other storage section built in the control section 140.

The control section 140 can further detect the user's operation by detecting an image of the user's body contained in the captured image.

Further, the regions A11 to A26, each of which includes part of the captured image, and the conditions under which an image of the user's body is detected in each of the regions are set and stored, for example, at part of the data for operation detection 125. The control section 140 analyzes an image contained in the captured image, evaluates whether or not the image is an image of the user's body in accordance with the conditions set in the region containing the image, and detects the user's body. Occurrence of wrong detection can therefore be reduced in the process of detecting the user's operation on the basis of the captured image. For example, wrong detection that leads to determination representing that operation has been performed on the basis of an image of the body of a person who is not the user can be avoided.

In each of the regions set in a captured image, priority is set in accordance with the position of the region in the captured image, and whether an image contained in the region is an image of the user's body is determined in accordance with the priority. The control section 140 evaluates whether or not the image is an image of the user's body in accordance with the priority set in the region containing the image. The conditions contained in the data for operation detection 125 are set on the basis of the relationship between the position where the image display section 20 is mounted on the user and positions of the user's arms and hands and in correspondence with the probability of the position where an image of the user's body is captured. Occurrence of wrong detection in the case where the user's operation is detected on the basis of a captured image can therefore be reduced, whereby the detection accuracy can be increased and improvement in the detection accuracy can be expected.

Further, in the case where a plurality of regions are set in a captured image and in each of the regions is set priority according to the position of the region in the captured image, further improvement in the detection accuracy can be expected. Moreover, the priority that affects the process of detecting the operation is advantageously readily set and managed.

Further, as illustrated in FIG. 12, in the region located on the side facing the bottom side of a captured image can be set higher priority than in a region shifted from the bottom-side region to the top side of the captured image. In this example, higher priority is set in a region located on the side facing the bottom side, where an image of the user's body is likely to be captured when the user performs operation, than in a region located on the side facing the top side. As a result, the accuracy of detection of the user's operation can be increased. The side facing the bottom side of a captured image refers to the side facing a side that forms the bottom on the basis of the upward/downward direction at the time of imaging. Instead, the bottom side may be defined in a captured image in advance. The bottom side of a captured image outputted by the imaging control section 161 may simply be the lower long side of the rectangular captured image. Instead, the process of identifying the bottom side may be carried out. For example, in a case where additional data representing the orientation of a captured image or additional data representing the position of the bottom side of a captured image is added to the captured image, the bottom side of the captured image may be identified in accordance with the additional data.

Further, the control section 140 may detect an image that overlaps with the edge of a captured image as an image of the user's body. In this case, which is characterized in that operation performed with the user's hand, arm, or any other site is detected on the basis of the image captured with the camera 61 mounted on the user's head, an image of the user's body involved in the operation can be detected with high accuracy.

Further, the control section 140 may detect an image of a person's hand contained in a captured image and determine whether the detected hand image is an image of the user's body on the basis of whether the hand image is a right hand image or a left hand image and the position of the hand image in the captured image. In this case, which is characterized in that operation performed with the user's hand, arm, or any other site is detected on the basis of the image captured with the camera 61 mounted on the user's head, occurrence of wrong detection in the case where the user's operation is detected on the basis of the captured image can be reduced, whereby the detection accuracy can be increased.

Still further, in a case where a person's hand image detected in a captured image contains the edge of the captured image, the control section 140 may determine the hand image as an image of the user's body. In this case, which is characterized in that operation performed with the user's hand, arm, or any other site is detected on the basis of the image captured with the camera 61 mounted on the user's head, an image of the user's body involved in the operation can be detected with high accuracy.

The above embodiment has been described with reference to the configuration in which the HMD 100 estimates an operated target object and then quickly performs AR display corresponding to the operated target object. That is, the above description has been made of the configuration in which after the user's operation is detected in step S14 (FIG. 7) and an operated target object is estimated in step S15, a GUI or any other screen is quickly displayed. The invention is not limited to the configuration described above. For example, after the user's operation is detected, or after an operated target object is estimated, a predetermined period may be allowed to elapse and the AR display may then be performed.

The function described above can be achieved, for example, by causing the target estimation section 167 to estimate an operated target object that is a target of the AR display and then proceed to a standby state. In this case, also in the standby state, the target estimation section 167 keeps detecting the user's operation and estimating an operated target object. In a case where the operated target object being estimated by the target estimation section 167 does not change during a predetermined period set in advance, for example, in a case where no operated target object different from the temporarily estimated operated target object is estimated, the AR display control section 164 may start the AR display.

Instead, for example, the function described above may be achieved by providing a standby period in the period of the process in which the target estimation section 167 estimates an operated target object. In this case, for example, in step S41 (FIG. 13), the target estimation section 167 keeps carrying out the process of acquiring images identified by the operation detection section 165 in the operation detection process (FIG. 10) for a predetermined period and detects changes in the plurality of images acquired in the predetermined period. In a case where the acquired images change in a predetermined range, the target estimation section 167 may proceed to step S42.

Further, for example, the target estimation section 167 may repeatedly carry out the processes in steps S41 to S42 in a predetermined period after a target object close to the hand is selected in step S42, and when a state in which the selected target object does not change continues, the target estimation section 167 may proceed to step S43.

Further, for example, in a case where after a target object is estimated in step S45 or S47, the processes in steps S41 to S45 or S47 are carried out, and the same target object is continuously estimated multiple times, the target estimation section 167 may output information on the estimated target object to the AR display control section 164.

As described above, providing a time delay after the user performs operation but before the AR display is initiated allows stable AR display even in a case where the user operates a large number of objects. For example, in a case where the user searches for an object and grabs an object that is not a target object to be searched for with a hand, the object held by the hand is undesirably likely to be estimated as a target of the AR display, followed by the AR display. Therefore, in the case where the user holds a large number of objects with a hand, the AR display is successively initiated and terminated, possibly causing the user to be annoyed, and also possibly causing an increase in the processing burden on the HMD 100. In the case where a time delay is provided after the user performs operation but before the AR display is initiated as described above, when the user's operation includes operation of an object different from an operated target object, frequent starts and changes of the AR display can be avoided, advantageously resulting in stable display.

The invention is not limited to the configuration of the embodiment described above and can be implemented in a variety of aspects to the extent that they do not depart from the substance of the invention.

In the embodiment described above, the configuration in which a user visually recognizes an outside scene through the display section is not limited to the configuration in which the right optical image display section 26 and the left optical image display section 28 transmit outside light. For example, the invention is also applicable to a display apparatus that displays an image but does not allow a user to visually recognize an outside scene. Specifically, the invention is applicable to a display apparatus that displays images captured with the camera 61, an image and a CG produced on the basis of the captured images, video images based on prestored video data or externally inputted video data, and other types of image. An example of a display apparatus of this type may include a display apparatus that does not allow a user to visually recognize an outside scene or what is called a closed-type display apparatus. Further, a display apparatus that does not perform AR display, MR display, or VR display but displays externally inputted video data or analog video signal is, of course, an apparatus to which the invention is applied.

Further, for example, the image display sections 20, 20B, and 20C may be replaced with an image display section mounted, for example, as a cap or any other image display section mounted based on another method. That is, a display section that displays an image in correspondence with a user's left eye and a display section that displays an image in correspondence with the user's right eye only need to be provided. Moreover, the display apparatus according to the embodiment of the invention may, for example, be configured as a head mounted display incorporated in an automobile, an airplane, and other vehicles. Further, for example, the display apparatus may be configured as a head mounted display built in a helmet or other body protection gears. In this case, a positioning portion that determines the position of the display apparatus relative to a user's body and a portion that is positioned relative to the positioning portion can be a portion mounted on the user.

Further, in the embodiment described above, the description has been made of the configuration in which each of the image display sections 20, 20B, and 20C is separated from the control device 10 and they are connected to each other via the connection cable 40. The control device and each of the image display sections 20, 20B, and 20C can instead be integrated with each other, and the integrated unit can be mounted on a user's head.

The control device 10 may be a notebook computer, a tablet computer, or a desktop computer. Instead, the control device 10 may, for example, be a portable electronic apparatus including a game console, a mobile phone, a smartphone, and a portable media player, or any other dedicated apparatus. Further, the control device 10 may be configured to be separate from each of the image display sections 20, 20B, and 20C, and a variety of signals may be transmitted and received between the control device 10 and each of the image display sections 20, 20B, and 20C over wireless communication.

Further, for example, the configuration that generates image light in each of the image display sections 20, 20B, and 20C may include an organic EL (organic electroluminescence) display and an organic EL control section. Moreover, an LCOS (liquid crystal on silicon) device (LCoS is a registered trademark), a digital micromirror device, or any other device can be used as the configuration that generates image light.

The "display section" used in the invention corresponds to a configuration that outputs image light, and the HMD 100's operation of outputting image light has been called "displaying". That is, the embodiment described above illustrates the configuration in which the right and left image light generation units generate image light and the right optical image display section 26 and the left optical image display section 28 radiate the image light toward the user's right and left eyes to cause the image light to be incident on the user's right and left eyes. The configuration of the "display section" is not limited to the configuration described above. That is, any configuration that radiates the image light may be employed. For example, in the configuration of the present embodiment, the "right light guide unit" and the "left light guide unit" having the half-silvered mirrors 261A and 262A output the image light toward the user's eyes. As the configuration that generates image light, the right backlight 221 and the left backlight 222 as well as the right LCD 241 and the left LCD 242 are provided. The "display section" does not require this configuration as an essential portion.

For example, image light generated by a mechanism built in one or both of the right display driver 22 and the left display driver 24 of any of the image display sections 20, 20B, and 20C may be reflected off a reflection mechanism provided on the user's side of the image display section 20, that is, the side facing the user's eyes and outputted toward the user's eyes. The reflection mechanism can, for example, be a sweep system using a MEMS (micro electro mechanical systems) mirror. That is, a sweep system having a MEMS mirror that sweeps the light outputted from the image light generation units may be provided, and the light swept by the sweep system may be caused to be directly incident on the user's eyes. Further, the image display section 20 may be provided with an optical member on which a virtual image is formed by the light swept by the sweep system. The optical member uses the light swept with the MEMS mirror to form a virtual image. In this case, when the MEMS mirror sweeps light, a virtual image is formed on a virtual image formation plane, and the user captures the virtual image with the eyes to view (visually recognize) the image. The optical part in this case may be a part that guides light by reflecting the light multiple times, for example, the right light guide plate 261 and the left light guide plate 262 in the embodiment described above, or may be a half-silvered surface.

The sweep system is not limited to the configuration including a MEMS mirror. The mechanism that generates image light may also instead be a laser light source that emits a laser beam. For example, the invention is also applicable to a laser-retina-projection-type head mounted display. That is, a configuration in which a light output section may include a laser light source and an optical system that guides the laser beam from the laser light source to user's eyes may be employed. In this configuration, the laser beam is caused to be incident on each of the user's eyes, and the laser beam is swept over the retina to form an image on the retina, so that the user is allowed to visually recognize the image.

Instead, in place of the virtual image formation plane that receives the swept light, a diffraction grating may be used to guide the image light to the user's eyes. That is, the configuration in which the image light is guided through an optical member is not necessarily employed, and a configuration having only a function of guiding the image light toward the user's eyes by refracting and/or reflecting the image light may be employed.

In the configuration provided with a sweep system having a MEMS or any other component, changing the angle at which the sweep system is attached to each of the image display sections 20, 20B, and 20C allows the position where the user visually recognizes an image, that is, the position where an image is displayed to be changed. Therefore, in the process of changing the image display position in the embodiment described above, the angle of the sweep system may be changed instead of changing the position where images are displayed in the right LCD 241 and the left LCD 242.

As the optical system that guides the image light to the user's eyes, an employable configuration includes an optical member that transmits outside light externally incident on the display apparatus and allows the outside light along with the image light to be incident on the user's eyes. Another usable optical system may be an optical member that is disposed in a position in front of the user's eyes and overlaps with part of the visual field of the user or coincides with the entire visual field of the user.

In the embodiment described above, the configuration in which the half-silvered mirrors 261A and 262A form virtual images on part of the right optical image display section 26 and the left optical image display section 28, which are located in front of the user's eyes, is illustrated. The configuration described above is not necessarily employed in the invention, and a configuration in which an image is displayed in a display region that occupies the entire or majority of the right optical image display section 26 and the left optical image display section 28 may be employed. In this case, the process of reducing the size of an image may be included in the action of changing the position where the image is displayed.

Further, the optical elements in the embodiment of the invention are not limited to the right light guide plate 261 and the left light guide plate 262 having the half-silvered mirrors 261A and 262A and only need to be optical parts that cause the image light to be incident on the user's eyes. Specifically, a diffraction grating, a prism, or a holographic display section may be used.

The display apparatus according to the embodiment of the invention is not limited to a head mounted display, and the invention is also applicable to a variety of display apparatus, such as a flat panel display and a projector. A display apparatus according to an embodiment of the invention only needs to allow the user to visually recognize an image formed by image light along with outside light and may, for example, have a configuration in which an optical member that transmits outside light allows visual recognition of an image formed by the image light. Specifically, in addition to the head mounted display described above having the configuration in which an optical member that transmits outside light is provided, the invention is also applicable to a display apparatus that projects image light on a light transmissive flat surface or curved surface (made, for example, of glass or transparent plastic material) installed in a position separate from the user in an immobile or movable manner. A display apparatus of this type may, for example, be so configured that image light is projected on a window pane of a vehicle and a user in the vehicle and a user outside the vehicle are allowed to visually recognize an image formed by the image light along with scenes inside and outside the vehicle. Another display apparatus of this type may, for example, be so configured that image light is projected on a transparent, semi-transparent, or colored transparent display surface, such as a window pane of a building, installed in an immobile manner and users around the display surface are allowed to visually recognize an image formed by the image light along with an outside scene through the display surface.

At least part of the functional blocks shown in FIG. 4 and other figures may be achieved by hardware or hardware and software cooperating with each other, and the configuration formed of independent hardware resources shown in FIG. 4 is not necessarily employed. The programs executed by the control section 140 may be stored in the storage section 120 or another storage device (not shown) in the control device 10, or a program stored in an external device may be acquired via the communication section 117 or the interface 114 and executed. Among the configurations formed in the control device 10, only the operation section 111 may be formed as a sole user interface (UI). Further, the configurations formed in the control device 10 may be redundantly formed in the image display section 20. For example, the control section 140 may be formed both in the control device 10 and the image display section 20, and the control section 140 formed in the control device 10 and a CPU formed in the image display section 20 may perform different functions.

The entire disclosure of Japanese Patent Application No. 2015-236321, filed Dec. 3, 2015 is expressly incorporated by reference herein.

What is claimed is:

1. An information processing apparatus comprising:
   an camera that captures an image over a range including at least part of a user's field of view, the image captured by the camera containing a person's hand and a plurality of objects, the hand being at a position with corresponding distances from the plurality of objects; and
   a controller that detects an image of the hand, evaluates whether the detected hand image is an image of the user's hand based on whether the hand image is a right hand image or a left hand image and a position of the hand image in the captured image, detects the user's operation based on an image captured by the camera and estimates a target object from objects contained in the captured image in accordance with the detected operation.

2. The information processing apparatus according to claim 1,
   wherein a region containing part of the captured image and a condition under which an image of the user's hand is detected in the region are required, and
   the controller evaluates whether or not an object contained in the captured image is an image of the user's hand in accordance with the condition required in the region containing the object to detect the user's hand.

3. The information processing apparatus according to claim 2,
   wherein priority is set in the region in accordance with a position of the region in the captured image, and whether the object contained in the region is an image of the user's hand is evaluated in accordance with the priority, and
   the controller evaluates whether or not the object is an image of the user's hand in accordance with the priority set in the region containing the object.

4. The information processing apparatus according to claim 3,
   wherein the region is formed of a plurality of regions, and in each of the regions is set priority according to the position of the region in the captured image.

5. The information processing apparatus according to claim 3,
   wherein in the region located on a side facing a bottom side of the captured image is set higher priority than in the region shifted from the bottom-side region to a top side of the captured image.

6. The information processing apparatus according to claim 1,
   wherein the controller detects the object that overlaps with an edge of the captured image as an image of the user's hand.

7. The information processing apparatus according to claim 1,
   wherein in a case where the image of the hand contains an edge of the captured image, the controller determines the hand image as an image of the user's hand.

8. The information processing apparatus according to claim 1,
   further comprising a distance sensor that detects a distance to a measurement target object,
   wherein the controller detects, among the objects contained in the captured image, an object located in a position separate by a distance that is detected by the distance sensor and is smaller than or equal to a predetermined value as an image of the user's hand.

9. The information processing apparatus according to claim 8,
   wherein in a case where the distance detected by the distance sensor to the measurement target object corresponding to the hand image contains a plurality of distances set in advance, the controller determines the hand image as an image of the user's hand.

10. The information processing apparatus according to claim 1,
    wherein the controller estimates, among the objects contained in the captured image, an object separate from the user's hand by a predetermined distance or smaller as the target object.

11. The information processing apparatus according to claim 10,
    wherein the controller detects an image of a shadow of the user's hand in the captured image, and
    the controller estimates, among the objects contained in the captured image, the object located in a position separate from the image of the shadow of the body by a predetermined distance or smaller as the target object.

12. The information processing apparatus according to claim 1,
    further comprising an interface that acquires a state or a result of detection performed by a body mounted detection apparatus mounted on the user's hand,
    wherein the controller estimates the target object based on the detection result acquired by the interface.

13. A display apparatus comprising:
a display mounted on a user's head;
an camera that captures an image over a range including at least part of the user's field of view, the image captured by the camera containing a person's hand and a plurality of objects, the hand being at a position with corresponding distances from the plurality of objects; and
a controller that detects an image of the hand, evaluates whether the detected hand image is an image of the user's hand based on whether the hand image is a right hand image or a left hand image and a position of the hand image in the captured image, detects the user's operation based on an image captured by the camera and estimates a target object from objects contained in the captured image in accordance with the detected operation.

14. The display apparatus according to claim 13, wherein the controller detects the objects contained in the captured image and causes the display to display a GUI image in accordance with a position and a shape of an object other than the user's hand.

15. The display apparatus according to claim 14, further comprising a distance sensor that detects a distance to a measurement target object,
wherein the controller causes the display to display the GUI image based on a distance to the measurement target object corresponding to the object other than the user's hand.

16. An information processing method comprising:
capturing an image with a camera over a range including at least part of a user's field of view, the image captured by the camera containing a person's hand and a plurality of objects, the hand being at a position with corresponding distances from the plurality of objects;
detecting an image of the hand;
evaluating whether the detected hand image is an image of the user's hand based on whether the hand image is a right hand image or a left hand image and a position of the hand image in the captured image; and
detecting the user's operation based on an image captured by the camera and estimating any of a plurality of objects contained in the captured image as a target object in accordance with the detected operation.

17. A non-transitory computer-readable storage medium embedded therein a program executable by a computer that controls an information processing apparatus, the computer carrying out:
capturing an image with a camera over a range including at least part of a user's field of view, the image captured by the camera containing a person's hand and a plurality of objects, the hand being at a position with corresponding distances from the plurality of objects;
detecting an image of the hand;
evaluating whether the detected hand image is an image of the user's hand based on whether the hand image is a right hand image or a left hand image and a position of the hand image in the captured image; and
detecting the user's operation based on an image captured by the camera and estimating any of a plurality of objects contained in the captured image as a target object in accordance with the detected operation.

* * * * *